(12) United States Patent
Koide et al.

(10) Patent No.: US 9,670,596 B2
(45) Date of Patent: Jun. 6, 2017

(54) PRODUCTION METHOD FOR PURIFIED POLYSACCHARIDE FIBERS, PURIFIED POLYSACCHARIDE FIBERS, FIBER-RUBBER COMPLEX, AND TIRE

(71) Applicant: BRIDGESTONE CORPORATION, Tokyo (JP)

(72) Inventors: Mitsuharu Koide, Tokyo (JP); Kenichi Sugimoto, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/402,154

(22) PCT Filed: May 21, 2013

(86) PCT No.: PCT/JP2013/064104
§ 371 (c)(1),
(2) Date: Nov. 19, 2014

(87) PCT Pub. No.: WO2013/176138
PCT Pub. Date: Nov. 28, 2013

(65) Prior Publication Data
US 2015/0148458 A1 May 28, 2015

(30) Foreign Application Priority Data

May 21, 2012 (JP) .................. 2012-116077
May 21, 2012 (JP) .................. 2012-116078
(Continued)

(51) Int. Cl.
*D01F 2/02* (2006.01)
*D01F 9/00* (2006.01)
(Continued)

(52) U.S. Cl.
CPC .............. *D01F 2/02* (2013.01); *B60C 1/0041* (2013.04); *B60C 9/0042* (2013.04); *C08L 1/02* (2013.01);
(Continued)

(58) Field of Classification Search
CPC ..... D01F 2/02; D01F 9/00; C08L 1/02; C08L 21/00
See application file for complete search history.

(56) References Cited

U.S. PATENT DOCUMENTS

| | | |
|---|---|---|
| 1,943,176 A | 1/1934 | Graenacher |
| 2,036,606 A | 4/1936 | Richter et al. |

(Continued)

FOREIGN PATENT DOCUMENTS

| | | |
|---|---|---|
| CN | 1851063 A | 10/2006 |
| CN | 101328626 A1 | 12/2008 |

(Continued)

OTHER PUBLICATIONS

International Search Report for PCT/JP2013/064104 dated Aug. 13, 2013.
(Continued)

*Primary Examiner* — Robert Harlan
(74) *Attorney, Agent, or Firm* — Sughrue Mion, PLLC

(57) ABSTRACT

The present invention provides a production method for purified polysaccharide fibers in which carbon disulfide emission is suppressed while efficiently producing purified polysaccharide fibers having excellent strength, purified polysaccharide fibers produced by using the production method, a fiber-rubber complex using the purified polysaccharide fibers, and a tire having excellent tire characteristics using the fiber-rubber complex. The production method for purified polysaccharide fibers of the present invention is a production method for purified polysaccharide fibers of
(Continued)

wet-spinning or dry-wet-spinning polysaccharide by bringing a polysaccharide solution obtained by dissolving a polysaccharide raw material in a liquid including an ionic liquid into contact with a solidification liquid including an ionic liquid, in which a concentration of the ionic liquid in the solidification liquid is 0.4% by weight to 50% by weight and the anionic moieties of the ionic liquid in the polysaccharide solution and the ionic liquid in the solidification liquid have one or more types selected from the group consisting of a phosphinate ion, a phosphate ion, and a phosphonate ion.

35 Claims, 6 Drawing Sheets

(30) Foreign Application Priority Data

| | | |
|---|---|---|
| May 21, 2012 | (JP) | 2012-116079 |
| May 21, 2012 | (JP) | 2012-116085 |
| May 21, 2012 | (JP) | 2012-116086 |
| May 21, 2012 | (JP) | 2012-116087 |

(51) Int. Cl.

| | |
|---|---|
| C08L 1/02 | (2006.01) |
| C08L 21/00 | (2006.01) |
| D02G 3/48 | (2006.01) |
| D01F 2/00 | (2006.01) |
| B60C 9/00 | (2006.01) |
| D01D 5/06 | (2006.01) |
| D01F 13/02 | (2006.01) |
| B60C 1/00 | (2006.01) |

(52) U.S. Cl.
CPC .............. *C08L 21/00* (2013.01); *D01D 5/06* (2013.01); *D01F 2/00* (2013.01); *D01F 9/00* (2013.01); *D01F 13/02* (2013.01); *D02G 3/48* (2013.01); *B60C 2001/0066* (2013.04); *B60C 2001/0083* (2013.04); *C08L 2205/16* (2013.01); *D10B 2201/00* (2013.01); *Y02P 70/627* (2015.11)

(56) References Cited

U.S. PATENT DOCUMENTS

| | | | |
|---|---|---|---|
| 2,878,118 | A | 3/1959 | Rogers et al. |
| 2006/0099419 | A1 | 5/2006 | Kwon et al. |
| 2008/0269477 | A1 | 10/2008 | Stegmann et al. |
| 2010/0256352 | A1 | 10/2010 | Uerdingen et al. |
| 2012/0253030 | A1 | 10/2012 | Kapoor |
| 2013/0248077 | A1 | 9/2013 | Sugimoto et al. |
| 2015/0148458 | A1 | 5/2015 | Koide et al. |

FOREIGN PATENT DOCUMENTS

| | | | | |
|---|---|---|---|---|
| CN | 101346416 A | 1/2009 | | |
| CN | 101608347 A | 12/2009 | | |
| CN | 101748499 A | 6/2010 | | |
| CN | 102154720 A | 8/2011 | | |
| CN | 103046146 A | 4/2013 | | |
| CN | 104471121 A | 3/2015 | | |
| EP | 1 980 653 A2 * | 10/2008 | ............... | D01F 2/00 |
| EP | 1980653 A2 | 10/2008 | | |
| GB | 2451046 A | 1/2009 | | |
| JP | 60-144322 A | 7/1985 | | |
| JP | 2005-23508 A | 1/2005 | | |
| JP | 2006-188806 A | 7/2006 | | |
| JP | 2008-248466 A | 10/2008 | | |
| JP | 4242768 B2 | 3/2009 | | |
| JP | 4478392 B2 | 6/2010 | | |
| JP | 2011-505435 A | 2/2011 | | |
| JP | 2012-132137 A | 7/2012 | | |
| JP | 2013-507534 A | 3/2013 | | |
| KR | 10-0575378 B1 | 5/2006 | | |
| WO | 98/22642 A1 | 5/1998 | | |
| WO | 2007128268 A2 | 11/2007 | | |
| WO | 2011/048609 A2 | 4/2011 | | |
| WO | 2011048420 A1 | 4/2011 | | |
| WO | 2011048608 A2 | 4/2011 | | |
| WO | WO 2011/048420 A1 * | 4/2011 | ............... | D01F 2/00 |
| WO | 2012074019 A1 | 6/2012 | | |
| WO | 2012/156441 A1 | 11/2012 | | |
| WO | 2013/176138 A1 | 11/2013 | | |

OTHER PUBLICATIONS

Communication dated Oct. 20, 2015 from the Japanese Patent Office in counterpart application No. 2012-116087.

Communication dated Oct. 20, 2015 from the Japanese Patent Office in counterpart application No. 2012-116086.

Communication dated Oct. 12, 2015 from the State Intellectual Property Office of the People's Republic of China in counterpart Application No. 201380038464.5.

Qin et al., "Dissolution or extraction of crustacean shells using ionic liquids to obtain high molecular weight purified chitin and direct production of chitin films and fibers", Green Chemistry, 2010, vol. 12, pp. 968-971.

Non-Final Office Action issued in U.S. Appl. No. 14/892,246 dated Jul. 21, 2016.

International Search Report of PCT/JP2014/063472 dated Aug. 19, 2014.

* cited by examiner

PRODUCTION METHOD FOR PURIFIED POLYSACCHARIDE FIBERS, PURIFIED POLYSACCHARIDE FIBERS, FIBER-RUBBER COMPLEX, AND TIRE

TECHNICAL FIELD

The present invention relates to a production method for purified polysaccharide fibers, purified polysaccharide fibers, purified cellulose, a production method for polysaccharide solids, a polysaccharide solid, a cord, a fiber-rubber complex, and a tire.

This application is a National Stage of International Application No. PCT/JP2013/064104 filed May 21, 2013, claiming priority based on Japanese Patent Application No. 2012-116086 filed May 21, 2012, Japanese Patent Application No. 2012-116087 filed May 21, 2012, Japanese Patent Application No. 2012-116085 filed May 21, 2012, Japanese Patent Application No. 2012-116077 filed May 21, 2012, Japanese Patent Application No. 2012-116078 filed May 21, 2012, and Japanese Patent Application No. 2012-116079 filed May 21, 2012, the contents of which are incorporated herein by reference.

BACKGROUND ART

Since cellulose fibers have advantages such as good dimensional stability, high adhesiveness, and a low temperature dependence of an elastic modulus (change in elastic modulus with respect to a temperature change), the cellulose fibers have been widely used in a tire as rayon.

However, since carbon disulfide is emitted in a process of producing rayon and the environmental load is very high, the cellulose fibers are not suitable for present day requirements aiming to produce products with raw materials that have a low environmental load.

The characteristics of the fiber material such as the above-described good dimensional stability, high adhesiveness, and low temperature dependence of an elastic modulus are significantly dependent on the fact that the fiber material is cellulose. Though synthetic fibers such as polyester and nylon are also used as a tire reinforcement cord, it is difficult to obtain the same degree of dimensional stability, adhesiveness, and elastic modulus as in the cellulose fibers.

Therefore, even though the environmental load is high, rayon is used in some tires at present.

In recent years, the environmental protection of the earth has been advocated, and thus, the use of cellulose that does not depend on fossil fuels as a raw material is desired. The use of carbon disulfide giving high environmental load in the production of rayon which is the above-described problem is needed in order to melt or dissolve cellulose when filming or fiberizing (spinning) cellulose.

In order to melt or dissolve a cellulose raw material, it is necessary to break intramolecular and intermolecular hydrogen bonds of three hydroxyl groups present in one repeating unit of cellulose. In the production of rayon, since it is possible to chemically modify the hydroxyl groups and break the hydrogen bonds by carbon disulfide, it is possible to melt or dissolve the cellulose raw material. In this manner, cellulose fibers obtained by spinning by chemically modifying the hydroxyl groups and regenerating the hydroxyl groups are generally called a regenerated cellulose.

As the raw material of the purified cellulose fiber, dissolving pulp having high purity can be used. The dissolving pulp having high purity is manufactured by purifying wood chips. Though the components included in wood depend on the species of wood, the components included are cellulose of 40% by weight to 60% by weight, hemicellulose of 10% by weight to 30% by weight, and lignin of 15% by weight to 30% by weight.

When a large amount of hemicellulose components is included in the purified cellulose fibers, strength tends to be decreased, and thus, the dissolving pulp having high purity is manufactured by purifying wood chips to remove lignin and hemicellulose. The proportion of the cellulose component in the dissolving pulp is 98% by weight or greater.

Furthermore, in a case of producing viscose rayon by using a viscose method, there is a tendency that a decrease in the molecular weight is severe in the step of dissolving cellulose, and by this, it is difficult to obtain a strong fiber. For this reason, in order to ensure high strength, it is necessary to use a material which does not include a low-molecular-weight component and has a proportion of the cellulose component of 98% by weight or greater.

Currently, the reason why cellulose fibers other than rayon are not widely used for tire reinforcement is that it is difficult to use a method by which high strength and break elongation are obtained when fiberizing cellulose, in addition to it being difficult to melt and dissolve a cellulose raw material by an industrially established method.

In contrast, according to a production method for purified cellulose fibers produced by using N-methylmorpholine-N-oxide (NMMO) as a solvent, it is possible to dissolve a cellulose raw material without chemical modification of the cellulose itself and without emitting carbon disulfide, and purified cellulose fibers obtained by dry-wet-spinning the cellulose using the cellulose solution produced by the method are excellent from the viewpoint that the environmental load is small and the chemically modified hydroxyl group does not remain (PTL 6).

However, purified cellulose fibers produced by using NMMO as a solvent do not satisfy the physical properties required for tire applications such as strength and break elongation.

In addition, in a case of using NMMO as a solvent, it is necessary to dissolve the cellulose raw material after swelling the cellulose raw material over a long period of time under vacuum distillation, and when excessively heated, there is a risk of explosion by a decomposition reaction of NMMO.

On the other hand, several types of the ionic liquids which efficiently dissolve the cellulose raw material have been reported (refer to PTLs 1 to 3). Dissolution of the cellulose raw material by the ionic liquid is due to solvation, and harmful substances such as carbon disulfide are not emitted in a process of producing purified cellulose fibers. Production of purified cellulose fibers is easily achieved by making a dissolved cellulose raw material pass through water, alcohol, or an aqueous solution of water and the ionic liquid. For this reason, in dissolution of cellulose by the ionic liquid, it is possible to suppress a decrease in the molecular weight of the cellulose (refer to PTLs 4 and 5). Spinning of cellulose using such an ionic liquid has been reported in PTLs 4 and 5. The production method for purified cellulose fibers obtained by using the ionic liquid can be said to be a method with a low environmental load.

In a tire, generally, the purified cellulose fibers are used as a fiber-rubber complex obtained by twisting the purified cellulose fibers to make a cord and coating the cord with rubber after an adhesion treatment. Fibers used in a tire are mainly used for the purpose of reinforcing rubber, and thus, fibers having high strength are preferable. It is possible to reduce the amount of fibers used in a tire as the strength of the fiber is high, and as a result, it is possible to reduce tire weight and rolling resistance.

Furthermore, by being able to reduce the amount of fibers used, it is possible to reduce the materials and energy required for tire production.

CITATION LIST

Patent Literature

[PTL 1] U.S. Pat. No. 1,943,176
[PTL 2] Japanese Unexamined Patent Application, First Publication No. S60-144322
[PTL 3] Japanese Patent No. 4242768
[PTL 4] United States Patent Application, Publication No. 2008/0269477
[PTL 5] Chinese Patent No. 101328626
[PTL 6] Japanese Unexamined Patent Application, First Publication No. 2006-188806

SUMMARY OF INVENTION

Technical Problem

When wet-spinning or dry-wet-spinning a polysaccharide, the polysaccharide is solidified from the outside of the fiber (filament), and thus, in a case of viewing the fiber from the cross-sectional direction, there is a tendency that a difference of structures between the inside and the outside of the fiber is likely to be generated (a so-called skin-core structure is likely to be generated). A fiber having the skin-core structure has low strength, and a tire produced by using the fiber has poor tire characteristics.

In addition, in the production method for purified polysaccharide fibers of wet-spinning or dry-wet-spinning polysaccharide by bringing a polysaccharide solution into contact with a solidification liquid including the ionic liquid, the ionic liquid is recycled by recovering the ionic liquid from the solidification liquid held in the solidification bath and using the recovered ionic liquid for spinning again. The recycling rate significantly affects the productivity of fibers, and thus, the recycling rate is preferably as high as possible. The present inventors found that the concentration of the ionic liquid in a solidification liquid is closely related to the recycling rate.

Furthermore, the present inventors found that the concentration of the ionic liquid in a solidification liquid is closely related to the moldability of fiber.

The present invention has been made in consideration of the above circumstances, and has an object of providing a production method for purified polysaccharide fibers in which carbon disulfide emission is suppressed while efficiently producing purified polysaccharide fibers having excellent strength, purified polysaccharide fibers produced by using the production method, a fiber-rubber complex using the purified polysaccharide fibers, and a tire having excellent tire characteristics using the fiber-rubber complex.

In addition, the present invention has an object of providing a production method for purified polysaccharide fibers having high strength in which the recycling rate of the ionic liquid is excellent, purified polysaccharide fibers produced by using the production method, a fiber-rubber complex using the purified polysaccharide fibers, and a tire having excellent tire characteristics using the fiber-rubber complex.

In addition, a large amount of chemicals and energy is used to purify a dissolving pulp having high purity of which the proportion of the cellulose component is 98% by weight or greater, and there is a problem of waste water treatment.

In addition, it is clear that a case of using only cellulose in fiber is not an effective use of resources. If it is possible to also use hemicellulose in fiber, it is possible to use most of wood components, and thus, it is possible to save chemicals and energy needed for purification, and it is possible to achieve resource saving.

The present invention has been made in consideration of the above circumstances, and has an object of providing purified polysaccharide fibers having excellent strength produced by a method having a high resource usage rate, a fiber-rubber complex using the purified polysaccharide fibers, and a tire having excellent tire characteristics using the fiber-rubber complex.

In addition, when producing a polysaccharide fiber by wet-spinning or dry-wet-spinning a polysaccharide using a polysaccharide solution obtained by dissolving a polysaccharide raw material including polysaccharides such as cellulose in the ionic liquid, changing a running direction of spinning the polysaccharide fibers, by the solidification liquid which is a liquid for solidifying the polysaccharide, is essential in terms of an effective usage of the production space.

The change of the running direction of the fibers is performed by arranging a guide or a roller in the solidification bath which holds the solidification liquid or after the fiber is taken out from the solidification bath.

However, the present inventors made it clear that in such a process of producing polysaccharide fibers, depending on the properties of a guide or a roller, thread breakage and fiber fluff, and yarn nubble from the production line frequently occur, and the productivity is significantly affected.

The present invention has been made in consideration of the above circumstances, and has an object of providing a production method for polysaccharide fibers which has a low environmental load by suppressing carbon disulfide emission and is excellent in productivity, polysaccharide fibers without thread breakage and fluff, a cord, a fiber-rubber complex, and a tire.

In addition, in a case where the cellulose fiber is used for industrial uses, the cellulose fiber is required to have higher strength compared to a case of usages for clothing.

In a case of strengthening the cellulose fiber, it is desirable to spin cellulose at a high speed, and high speed (spinning speed) is also desirable from the viewpoint of productivity.

In a case of wet-spinning or dry-wet-spinning cellulose, a cellulose solution (spinning solution) obtained by dissolving a cellulose raw material in an ionic liquid is extruded from a spinneret of an extruder in a thread shape, and is passed through a solidification bath that is filled with a solidification liquid which is a liquid for solidifying the cellulose. Through the process, the cellulose is solidified.

However, with the rise of the spinning speed, the friction between the cellulose fiber and the solidification liquid is increased, and by this, tension is applied to the cellulose fiber, the cellulose fiber is eventually broken by excessive tension, and by this, a problem in that productivity is decreased occurs.

The present invention has been made in consideration of the above circumstances, and has an object of providing purified cellulose fibers having excellent strength and having good productivity produced by using raw materials which have a low environmental load by suppressing carbon disulfide emission, a fiber-rubber complex using the purified cellulose fibers, and a tire using the fiber-rubber complex.

Moreover, the ionic liquid capable of dissolving the polysaccharide raw material containing polysaccharides including cellulose has corrosivity with respect to various metals and alloys. Therefore, in a case of producing a polysaccharide fiber using the ionic liquid by using the production facilities of the polysaccharide solids such as polysaccharide fibers in the related art, the production facilities of the polysaccharide solids deteriorate by a corrosive action.

Due to the deterioration of the production facilities of the polysaccharide solids, the productivity of the polysaccharide solids is reduced by frequent maintenance of facilities, and thus, there is still room for improvement of the production apparatus of the polysaccharide solids using the ionic liquid.

The present invention has been made in consideration of the above circumstances, and has an object of providing an apparatus that is capable of producing polysaccharide solids which have a low environmental load by suppressing carbon disulfide emission without decreasing productivity, a production method for polysaccharide solids, polysaccharide solids, a cord, a fiber-rubber complex, and a tire.

Solution to Problem

The present invention provides a production method for purified polysaccharide fibers having the following characteristics, purified polysaccharide fibers, purified cellulose fibers, an apparatus that produces a polysaccharide solid, a production method for polysaccharide solids, polysaccharide solids, a cord, a fiber-rubber complex, and a tire.

(1) A production method for purified polysaccharide fibers of wet-spinning or dry-wet-spinning polysaccharide by bringing a polysaccharide solution obtained by dissolving a polysaccharide raw material in a liquid including an ionic liquid into contact with a solidification liquid including an ionic liquid, in which a concentration of the ionic liquid in the solidification liquid is 0.4% by weight to 70% by weight, each of the ionic liquid in the polysaccharide solution and the ionic liquid in the solidification liquid is formed of a cationic moiety and an anionic moiety, and the anionic moiety has one or more types selected from the group consisting of a phosphinate ion, a phosphate ion, and a phosphonate ion represented by the following general formula (C2).

[Chem. 1]

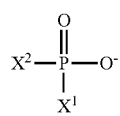

(C2)

[In the formula, each of $X^1$ and $X^2$ independently represents a hydrogen atom, a hydroxyl group, or an alkoxy group having 1 to 4 carbon atoms.]

(2) The production method for purified polysaccharide fibers according to (1), in which a plurality of solidification baths is disposed, from upstream toward downstream in a process of spinning the polysaccharide using the plurality of solidification baths which holds the solidification liquid, such that the concentration of the ionic liquid in the solidification liquid which is held is sequentially lowered, on a front side of the solidification bath of the uppermost upstream, the polysaccharide in the polysaccharide solution is extruded, thereafter, a semi-solid product of purified polysaccharide fibers is obtained by passing through the solidification bath, and the semi-solid product is solidified by sequentially using the other solidification baths toward downstream, whereby a purified polysaccharide fiber is obtained.

(3) The production method for purified polysaccharide fibers according to (1) or (2), in which the polysaccharide is cellulose.

(4) The production method for purified polysaccharide fibers according to any one of (1) to (3), in which the solidification liquid is formed of the ionic liquid, water, and/or an organic solvent.

(5) The production method for purified polysaccharide fibers according to (4), in which the organic solvent is a polar solvent.

(6) The production method for purified polysaccharide fibers according to any one of (1) to (5), in which each temperature of all the solidification liquids is 5° C. to 60° C.

(7) The production method for purified polysaccharide fibers according to any one of (1) to (6), in which each retention time of the polysaccharides or the intermediates in all the solidification baths is 120 seconds or less.

(8) The production method for purified polysaccharide fibers according to any one of (1) to (7), in which the ionic liquid in the polysaccharide solution and the ionic liquid in the solidification liquid are the same type.

(9) The production method for purified polysaccharide fibers according to any one of (1) to (8), in which the cationic moiety is one or more types selected from the group consisting of an imidazolium ion, a pyridinium ion, an ammonium ion, and a phosphonium ion.

(10) The production method for purified polysaccharide fibers according to (9), in which the cationic moiety is the imidazolium ion.

(11) The production method for purified polysaccharide fibers according to (10), in which the cationic moiety is the imidazolium ion represented by the following general formula (C1).

[Chem. 2]

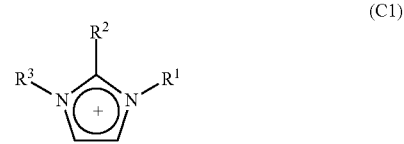

(C1)

[In the formula, $R^1$ represents an alkyl group having 1 to 4 carbon atoms or an alkenyl group having 2 to 4 carbon atoms, $R^2$ represents a hydrogen atom or a methyl group, and $R^3$ represents an alkyl group having 1 to 8 carbon atoms or an alkenyl group having 2 to 8 carbon atoms.]

(12) The production method for purified polysaccharide fibers according to any one of (1) to (11), in which the ionic liquid in the polysaccharide solution and/or the ionic liquid in the solidification liquid is 1-ethyl-3-methylimidazolium diethylphosphate.

(13) The production method for purified polysaccharide fibers according to any one of (1) to (12), in which the distance D from a place where the polysaccharide solution is extruded to be a fiber shape to a place where the extruded polysaccharide solution is in contact with the solidification liquid is 50 mm to 120 mm.

(14) A polysaccharide fiber produced by the production method for purified polysaccharide fibers according to any one of (1) to (13).

(15) The purified polysaccharide fiber according to (14), in which strength TB is 5.1 cN/dtex or greater.

(16) The purified polysaccharide fiber according to (14) or (15), in which the strength TB is 5.4 cN/dtex or greater.

(17) A fiber-rubber complex produced by combining the purified polysaccharide fiber according to any one of (14) to (16) and a rubber material.

(18) A tire, in which the fiber-rubber complex according to (17) is used.

(19) The tire according to (18), in which the fiber-rubber complex is used as a carcass ply, a belt ply, or a belt-protecting layer.

(20) A production method for purified polysaccharide fibers of wet-spinning or dry-wet-spinning polysaccharide by bringing a polysaccharide solution obtained by dissolving a polysaccharide raw material in a liquid including an ionic liquid into contact with a solidification liquid including an ionic liquid, in which a concentration of the ionic liquid in the solidification liquid is 20% by weight to 70% by weight, the ionic liquid includes a recycled product recovered from the solidification liquid used when separately producing the purified polysaccharide fiber, and a recycling rate of the ionic liquid is 90% by weight or greater.

(21) The production method for purified polysaccharide fibers according to (20), in which the concentration of the ionic liquid in the solidification liquid is 50% by weight or less.

(22) The production method for purified polysaccharide fibers according to (20) or (22), in which the recycling rate of the ionic liquid is 93% by weight or greater.

(23) The production method for purified polysaccharide fibers according to any one of (20) to (22), in which a plurality of solidification baths is disposed, from upstream toward downstream of a process of spinning the polysaccharide using the plurality of solidification baths which holds the solidification liquid, such that the concentration of the ionic liquid in the solidification liquid which is held is sequentially lowered, an intermediate of the purified polysaccharide fiber is obtained by spinning the polysaccharide in the polysaccharide solution using the solidification bath of the uppermost upstream, and the intermediate is spun by sequentially using the other solidification baths toward downstream, whereby a purified polysaccharide fiber is obtained.

(24) The production method for purified polysaccharide fibers according to any one of (20) to (23), in which the polysaccharide is cellulose.

(25) The production method for purified polysaccharide fibers according to any one of (20) to (24), in which the solidification liquid is formed of the ionic liquid, water, and/or an organic solvent.

(26) The production method for purified polysaccharide fibers according to (25), in which the organic solvent is a polar solvent.

(27) The production method for purified polysaccharide fibers according to any one of (20) to (26), in which each temperature of all the solidification liquids is 5° C. to 60° C.

(28) The production method for purified polysaccharide fibers according to any one of (20) to (27), in which each retention time of the polysaccharides or the intermediates in all the solidification baths is 300 seconds or less.

(29) The production method for purified polysaccharide fibers according to any one of (20) to (28), including a process of recycling the ionic liquid from the solidification liquid using a spray dry method.

(30) The production method for purified polysaccharide fibers according to any one of (20) to (29), in which the ionic liquid in the polysaccharide solution and the ionic liquid in the solidification liquid are the same type.

(31) The production method for purified polysaccharide fibers according to any one of (20) to (30), in which each of the ionic liquid in the polysaccharide solution and the ionic liquid in the solidification liquid is formed of a cationic moiety and an anionic moiety, and the cationic moiety is one or more types selected from the group consisting of an imidazolium ion, a pyridinium ion, an ammonium ion, and a phosphonium ion.

(32) The production method for purified polysaccharide fibers according to (31), in which the cationic moiety is the imidazolium ion.

(33) The production method for purified polysaccharide fibers according to (32), in which the cationic moiety is the imidazolium ion represented by the following general formula (C1).

[Chem. 3]

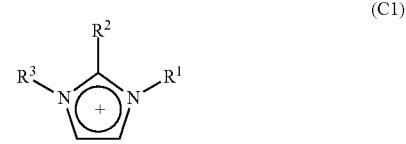

(C1)

[In the formula, $R^1$ represents an alkyl group having 1 to 4 carbon atoms or an alkenyl group having 2 to 4 carbon atoms, $R^2$ represents a hydrogen atom or a methyl group, and $R^3$ represents an alkyl group having 1 to 8 carbon atoms or an alkenyl group having 2 to 8 carbon atoms.]

(34) The production method for purified polysaccharide fibers according to any one of (31) to (33), in which the anionic moiety has a compound including a phosphorus atom.

(35) The production method for purified polysaccharide fibers according to (34), in which the compound including a phosphorus atom is any one of a phosphinate ion, a phosphate ion, and a phosphonate ion represented by the following general formula (C2).

[Chem. 4]

(C2)

[In the formula, each of $X^1$ and $X^2$ independently represents a hydrogen atom, a hydroxyl group, or an alkoxy group having 1 to 4 carbon atoms.]

(36) The production method for purified polysaccharide fibers according to any one of (20) to (35), in which the ionic liquid in the polysaccharide solution and/or the ionic liquid in the solidification liquid is 1-ethyl-3-methylimidazolium diethylphosphate.

(37) The production method for purified polysaccharide fibers according to any one of (20) to (36), in which the distance D from a place where the polysaccharide solution is extruded to be a fiber shape to a place where the extruded polysaccharide solution is in contact with the solidification liquid is 50 mm to 120 mm.

(38) A purified polysaccharide fiber produced by the production method for purified polysaccharide fibers according to any one of (20) to (37).

(39) The purified polysaccharide fiber according to (38), in which strength TB is 5.1 cN/dtex or greater.

(40) The purified polysaccharide fiber according to (38) or (39), in which the strength TB is 5.4 cN/dtex or greater.

(41) A fiber-rubber complex produced by combining the purified polysaccharide fiber according to any one of (38) to (40) and a rubber material.

(42) A tire, in which the fiber-rubber complex according to (41) is used.

(43) The tire according to (42), in which the fiber-rubber complex is used as a carcass ply, a belt ply, or a belt-protecting layer.

(44) A purified polysaccharide fiber produced by bringing a polysaccharide solution obtained by dissolving a polysaccharide raw material in a polar solvent or a liquid including an ionic liquid into contact with a solidification liquid and wet-spinning or dry-wet-spinning a polysaccharide, containing in which a main component formed of two or more types of polysaccharides including a first main component, in which a proportion of the first main component in all components constituting the purified polysaccharide fiber is 97% by weight or less.

(45) The purified polysaccharide fiber according to (44), in which the proportion of the first main component in all components constituting the purified polysaccharide fiber is 90% by weight or less.

(46) The purified polysaccharide fiber according to (44) or (45), in which a proportion of a polysaccharide fiber obtained from the polysaccharide raw material is 60% by weight or greater.

(47) The purified polysaccharide fiber according to any one of (44) to (46), in which the main component is formed of cellulose and hemicellulose.

(48) The purified polysaccharide fiber according to any one of (44) to (47), in which a proportion of the main component in all components constituting the purified polysaccharide fiber is 90% by weight or greater.

(49) The purified polysaccharide fiber according to (47) or (48), in which a proportion of the hemicellulose in all components constituting the purified polysaccharide fiber is 0.1% by weight to 40% by weight.

(50) The purified polysaccharide fiber according to any one of (44) to (49), in which the polar solvent is dipole molecules or zwitterionic molecules.

(51) The purified polysaccharide fiber according to any one of (44) to (50), in which the polar solvent is N-methylmorpholine-N-oxide.

(52) The purified polysaccharide fiber according to any one of (44) to (49), in which the ionic liquid is formed of a cationic moiety and an anionic moiety, and the cationic moiety is one or more types selected from the group consisting of an imidazolium ion, a pyridinium ion, an ammonium ion, and a phosphonium ion.

(53) The purified polysaccharide fiber according to (52), in which the cationic moiety is the imidazolium ion represented by the following general formula (C1).

[Chem. 5]

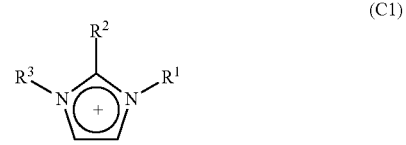

[In the formula, $R^1$ represents an alkyl group having 1 to 4 carbon atoms or an alkenyl group having 2 to 4 carbon atoms, $R^2$ represents a hydrogen atom or a methyl group, and $R^3$ represents an alkyl group having 1 to 8 carbon atoms or an alkenyl group having 2 to 8 carbon atoms.]

(54) The purified polysaccharide fiber according to (52) or (53), in which the anionic moiety has a compound including a phosphorus atom.

(55) The purified polysaccharide fiber according to (54), in which the compound including a phosphorus atom is any one of a phosphinate ion, a phosphate ion, and a phosphonate ion represented by the following general formula (C2).

[Chem. 6]

[In the formula, each of $X^1$ and $X^2$ independently represents a hydrogen atom, a hydroxyl group, or an alkoxy group having 1 to 4 carbon atoms.]

(56) The purified polysaccharide fiber according to any one of (44) to (55), in which strength TB is 5.1 cN/dtex or greater.

(57) The purified polysaccharide fiber according to any one of (44) to (56), in which the strength TB is 5.4 cN/dtex or greater.

(58) A fiber-rubber complex produced by combining the purified polysaccharide fiber according to any one of (44) to (57) and a rubber material.

(59) A tire, in which the fiber-rubber complex according to (58) is used.

(60) The tire according to (59), in which the fiber-rubber complex is used as a carcass ply, a belt ply, or a belt-protecting layer.

(61) A production method for purified polysaccharide fibers having a process in which a polysaccharide is spun by bringing a polysaccharide solution obtained by dissolving a polysaccharide raw material in a liquid including an ionic liquid into contact with a solidification liquid, and the obtained polysaccharide fiber is wound, in which the running direction of the polysaccharide fiber which is wound using a guide or a roller having a dynamic friction coefficient with respect to the polysaccharide fiber of 0.05 to 0.35 is changed.

(62) The production method for purified polysaccharide fibers according to (61), in which the ionic liquid is formed of a cationic moiety and an anionic moiety, and the cationic moiety is one or more types selected from the group consisting of an imidazolium ion, a pyridinium ion, an ammonium ion, and a phosphonium ion.

(63) The production method for purified polysaccharide fibers according to (61) or (62), in which the solidification liquid is one or more types selected from the group consisting of water, a polar solvent, and the ionic liquid.

(64) The production method for purified polysaccharide fibers according to (62) or (63), in which the cationic moiety is the imidazolium ion represented by the following general formula (1).

[Chem. 7]

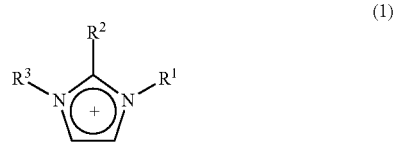

(1)

[In the formula, $R^1$ represents an alkyl group having 1 to 4 carbon atoms or an alkenyl group having 2 to 4 carbon atoms, $R^2$ represents a hydrogen atom or a methyl group, and $R^3$ represents an alkyl group having 1 to 8 carbon atoms or an alkenyl group having 2 to 8 carbon atoms.]

(65) The production method for purified polysaccharide fibers according to any one of (61) to (64), in which the guide or the roller is a metal, a fluorine-containing resin, or ceramic.

(66) The production method for purified polysaccharide fibers according to any one of (61) to (64), in which the surface of the guide or the roller is coated with a metal, a fluorine-containing resin, or ceramic.

(67) A polysaccharide fiber produced by the production method for polysaccharide fibers according to any one of (61) to (66).

(68) A cord produced by twisting the polysaccharide fiber according to (67).

(69) A fiber-rubber complex, in which the polysaccharide fiber according to (67) or the cord according to (68) is used.

(70) A tire, in which the fiber-rubber complex according to (69) is used.

(71) A purified cellulose fiber produced by discharging a cellulose solution obtained by dissolving a cellulose raw material in a liquid including an ionic liquid from a spinneret, bringing the discharged cellulose solution into contact with a solidification liquid, and wet-spinning or dry-wet-spinning a cellulose, in which the solidification liquid flows along the discharging direction of the cellulose solution discharged from the spinneret.

(72) The purified cellulose fiber according to (71), in which the ionic liquid is formed of a cationic moiety and an anionic moiety, and the cationic moiety is one or more types selected from the group consisting of an imidazolium ion, a pyridinium ion, an ammonium ion, and a phosphonium ion.

(73) The purified cellulose fiber according to (71) or (72), in which the cationic moiety is the imidazolium ion represented by the following general formula (1).

[Chem. 8]

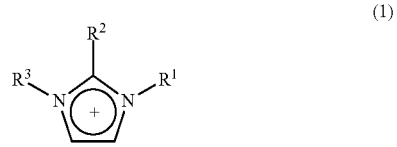

(1)

[In the formula, $R^1$ represents an alkyl group having 1 to 4 carbon atoms or an alkenyl group having 2 to 4 carbon atoms, $R^2$ represents a hydrogen atom or a methyl group, and $R^3$ represents an alkyl group having 1 to 8 carbon atoms or an alkenyl group having 2 to 8 carbon atoms.]

(74) The purified cellulose fiber according to any one of (71) to (73), in which a flow speed of the solidification liquid is 10% to 90% of a speed of winding the purified cellulose fiber spun.

(75) The purified cellulose fiber according to any one of (71) to (74), in which the flow speed of the solidification liquid is 30% to 80% of the speed of winding the purified cellulose fiber spun.

(76) The purified cellulose fiber according to any one of (71) to (75), in which the speed of winding the purified cellulose fiber is 50 m/min or greater.

(77) The purified cellulose fiber according to any one of (71) to (76), in which the speed of winding the purified cellulose fiber is 80 m/min or greater.

(78) The purified cellulose fiber according to any one of (71) to (77), in which the speed of winding the purified cellulose fiber is 120 m/min or greater.

(79) A fiber-rubber complex, in which the purified cellulose fiber according to any one of (71) to (78) is used.

(80) A tire, in which the fiber-rubber complex according to (79) is used.

(81) An apparatus that produces a polysaccharide solid is equipped with a dissolution apparatus that produces a polysaccharide solution obtained by dissolving a polysaccharide raw material in a liquid including an ionic liquid, a discharger that discharges the polysaccharide solution, a solidification bath that holds a solidification liquid for solidifying the polysaccharide by bringing the solidification liquid into contact with the discharged polysaccharide solution, and a cleaning bath that holds a cleaning solution for cleaning the solidified polysaccharide, in which a contact portion of the ionic liquid in the dissolution apparatus, the discharger, the solidification bath, and the cleaning bath is made of a material having corrosion resistance with respect to the ionic liquid.

(82) The apparatus that produces a polysaccharide solid according to (81), in which the ionic liquid is formed of a cationic moiety and an anionic moiety, and the cationic moiety is one or more types selected from the group consisting of an imidazolium ion, a pyridinium ion, an ammonium ion, and a phosphonium ion.

(83) The apparatus that produces a polysaccharide solid according to (81) or (82), in which the solidification liquid is one or more types selected from the group consisting of water, a polar solvent, and the ionic liquid.

(84) The apparatus that produces a polysaccharide solid according to (82) or (83), in which the cationic moiety is the imidazolium ion represented by the following general formula (1).

[Chem. 9]

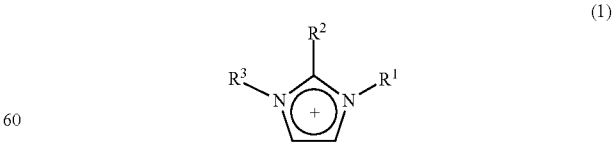

(1)

[In the formula, $R^1$ represents an alkyl group having 1 to 4 carbon atoms or an alkenyl group having 2 to 4 carbon atoms, $R^2$ represents a hydrogen atom or a methyl group, and $R^3$ represents an alkyl group having 1 to 8 carbon atoms or an alkenyl group having 2 to 8 carbon atoms.]

(85) The apparatus that produces a polysaccharide solid according to any one of (81) to (84), in which a corrosion rate with respect to the ionic liquid of the material having the corrosion resistance with respect to the ionic liquid is 0.5 mm/year or less.

(86) The apparatus that produces a polysaccharide solid according to any one of (81) to (85), in which the contact portion of the ionic liquid is coated with the material having corrosivity of the corrosion rate of 0.5 mm/year or less with respect to the ionic liquid.

(87) A production method for polysaccharide solids using the apparatus that produces the polysaccharide solid according to any one of (81) to (86), in which the polysaccharide solution is discharged into the solidification liquid which is held in the solidification bath from the discharger, and the solidified polysaccharide is cleaned in the cleaning bath which is held in the cleaning bath.

(88) The production method for polysaccharide solids according to (87), in which a fiber is obtained as the polysaccharide solid.

(89) A polysaccharide solid produced by the production method for polysaccharide solids according to (87) or (88).

(90) A cord produced by twisting the polysaccharide solid which is the fiber according to (89).

(91) A fiber-rubber complex, in which the polysaccharide solid which is the fiber according to (89) or the cord according to (90) is used.

(92) A tire, in which the fiber-rubber complex according to (91) is used.

Advantageous Effects of Invention

According to the production method for purified polysaccharide fibers of the present invention, since it is possible to efficiently produce purified polysaccharide fibers having excellent strength without generating harmful substances such as carbon disulfide, it is possible to reduce the environmental load.

In addition, according to the production method for purified polysaccharide fibers of the present invention, since it is possible to produce purified polysaccharide fibers having high strength in which the recycling rate of the ionic liquid is excellent, it is possible to reduce the environmental load.

Furthermore, according to the present invention, since it is possible to produce purified polysaccharide fibers by a method having a high resource usage rate, it is possible to reduce the environmental load.

In addition, since the purified polysaccharide fibers and the rubber-fiber complex of the present invention have excellent strength, the use value thereof is high.

Furthermore, since the tire of the present invention is made of the rubber-fiber complex of the present invention, the tire has good tire performance.

In addition, according to the production method for purified polysaccharide fibers of the present invention, since it is possible to produce polysaccharide fibers without generating harmful substances such as carbon disulfide, it is possible to reduce the environmental load.

Furthermore, in the production method for polysaccharide fibers of the present invention, thread breakage and fluff in the polysaccharide fibers are not generated, and in the production process, yarn nubble is not generated, and thus, the polysaccharide fibers are excellent in productivity.

In addition, in the polysaccharide fibers of the present invention, there is no thread breakage and fluff, and thus, a good quality is maintained.

In addition, according to the present invention, since it is possible to produce purified cellulose fibers without generating harmful substances such as carbon disulfide, it is possible to reduce the environmental load.

In addition, since the rubber-fiber complex of the present invention has excellent strength, and is made of purified cellulose fibers with good productivity, the use value thereof is high.

In addition, according to the apparatus that produces the polysaccharide solid of the present invention, since it is possible to efficiently produce a polysaccharide solid without generating harmful substances such as carbon disulfide, it is possible to reduce the environmental load.

In addition, since the polysaccharide solid of the present invention is efficiently produced using the apparatus that produces the polysaccharide solid, the quality is stable, and the use value thereof is high.

DESCRIPTION OF EMBODIMENTS

[Purified Polysaccharide Fiber]

Figure 1:
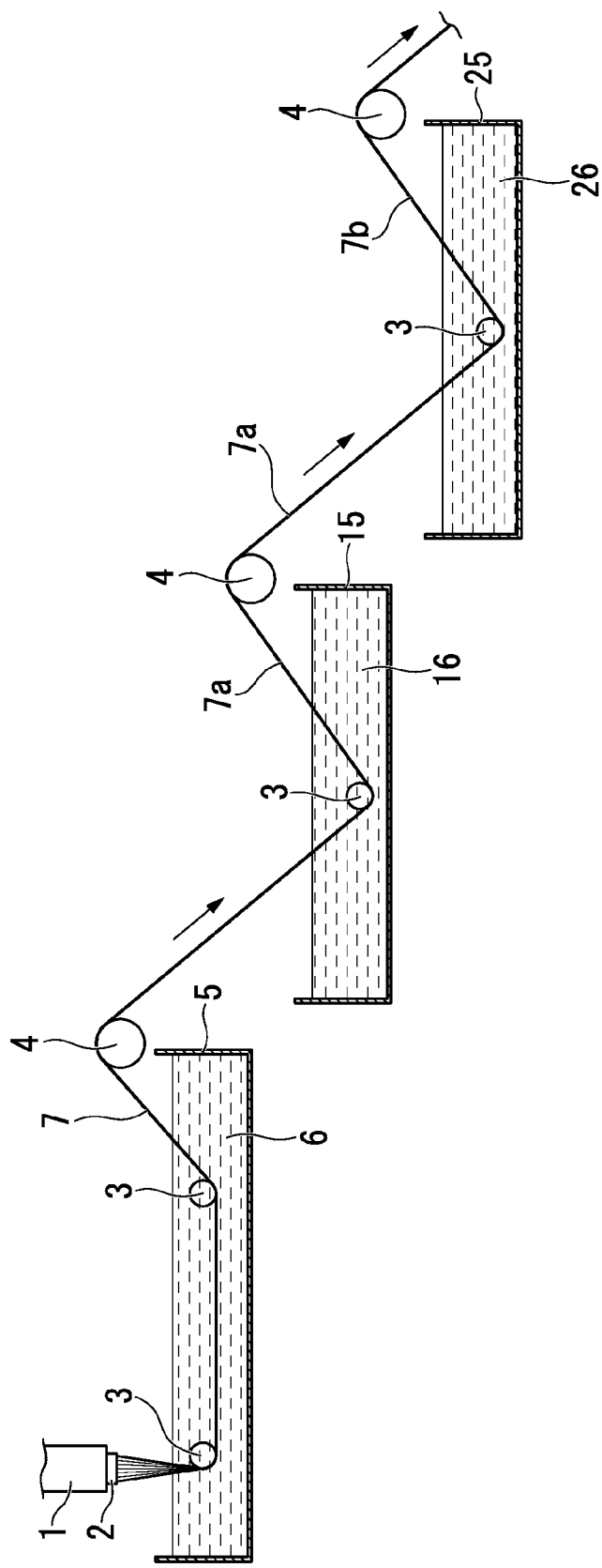
FIG. 1 is a schematic cross-sectional view illustrating a method for wet-spinning a polysaccharide.

First, the production method for purified polysaccharide fibers of the present invention will be described. Moreover, the term "polysaccharide" in the present application naturally includes "cellulose".

The production method for purified polysaccharide fibers of the present invention is a production method for purified polysaccharide fibers of wet-spinning or dry-wet-spinning polysaccharide by bringing a polysaccharide solution obtained by dissolving a polysaccharide raw material in a liquid including an ionic liquid into contact with a solidification liquid including an ionic liquid. The concentration of the ionic liquid in the solidification liquid is preferably 0.4% by weight to 70% by weight, and more preferably 20% by weight to 40% by weight. Each of the ionic liquid in the polysaccharide solution and the ionic liquid in the solidification liquid is formed of a cationic moiety and an anionic moiety, and the anionic moiety preferably has one or more types selected from the group consisting of a phosphinate ion, a phosphate ion, and a phosphonate ion represented by the following general formula (C2).

[Chem. 10]

[In the formula, each of $X^1$ and $X^2$ independently represents a hydrogen atom, a hydroxyl group, or an alkoxy group having 1 to 4 carbon atoms.]

The ionic liquid preferably includes a recycled product recovered from the solidification liquid used when separately producing a purified polysaccharide fiber, and the recycling rate of the ionic liquid is preferably 90% by weight or greater.

It is preferable that the purified polysaccharide fibers of the present invention be obtained by wet-spinning or dry-wet-spinning polysaccharide by bringing a polysaccharide solution obtained by dissolving a polysaccharide raw material in a polar solvent or a liquid including an ionic liquid into contact with a solidification liquid and it is preferable that the main component formed of two or more types of polysaccharides including the first main component be contained, and the proportion of the first main component in all components constituting the purified polysaccharide fiber be 97% by weight or less.

The different types of polysaccharides mean that the types of monosaccharides constituting the polysaccharide are different.

In addition, in the present invention, the main component means a component which is included in 1.0% by weight or greater in the purified polysaccharide fiber, and each component constituting the main component is referred to as the first main component, the second main component, or . . . in the order of proportions of the components.

In addition, the production method for purified polysaccharide fibers of the present invention is a production method for purified polysaccharide fibers having a process in which a polysaccharide is spun by bringing a polysaccharide solution obtained by dissolving a polysaccharide raw material in a liquid including an ionic liquid into contact with a solidification liquid, and the obtained polysaccharide fiber is wound, and is preferably a production method in which the running direction of the polysaccharide fiber which is wound using a guide or a roller having a dynamic friction coefficient with respect to the polysaccharide fiber of 0.05 to 0.35 is changed.

The apparatus that produces a polysaccharide solid of the present invention is an apparatus that produces a polysaccharide solid equipped with a dissolution apparatus that produces a polysaccharide solution obtained by dissolving a polysaccharide raw material in a liquid including an ionic liquid, a discharger that discharges the polysaccharide solution, a solidification bath that holds a solidification liquid for solidifying the polysaccharide by bringing the solidification liquid into contact with the discharged polysaccharide solution, and a cleaning bath that holds a cleaning solution for cleaning the solidified polysaccharide, and the contact portion of the ionic liquid in the dissolution apparatus, the discharger, the solidification bath, and the cleaning bath is made of a material having corrosion resistance with respect to the ionic liquid.

Next, the polysaccharide solid of the present invention will be described.

[Polysaccharide Solid]

The polysaccharide solid of the present invention is produced by solidifying polysaccharide by bringing a polysaccharide solution obtained by dissolving a polysaccharide raw material in a liquid including an ionic liquid into contact with a solidification liquid which is a liquid other than the polysaccharide solution.

Examples of the polysaccharide in the polysaccharide raw material (raw material including polysaccharides) used in the present invention include cellulose; cellulose derivatives such as ethyl cellulose, carboxymethyl cellulose, hydroxyethyl cellulose, hydroxypropyl cellulose, methylcellulose, nitrocellulose, and cationized cellulose; gum arabic; carrageenans such as κ-carrageenan, τ-carrageenan, and λ-carrageenan; guar gum; locust bean gum; pectin; tragacanth; corn starch; phosphorylated starch; and microbial polysaccharides such as xanthan gum and dextrin, and cellulose is preferably used.

The polysaccharide fibers of the present invention are produced by extruding a polysaccharide solution obtained by dissolving a polysaccharide raw material such as a cellulose raw material in a liquid including an ionic liquid to be a fiber shape and solidifying the polysaccharide by bringing the extruded polysaccharide solution into contact with the solidification liquid. As the spinning method, a wet spinning method or a dry wet spinning method is preferably used.

The spinning method of the wet spinning or the dry wet spinning is not particularly limited, and it is possible to spin polysaccharide by a known spinning method.

In addition, as the polysaccharide in a polysaccharide raw material, chitin can also be exemplified. The chitin may be natural chitin or regenerated chitin, and as the natural chitin, chitin included in the outer shell of crustaceans such as insects, shrimps, and crabs or in plants such as mushrooms can be exemplified.

[Purified Cellulose Fiber]

Next, the purified cellulose fibers used in the fiber-rubber complex of the present invention will be described.

The purified cellulose fibers used in the present invention are purified cellulose fibers produced by discharging a cellulose solution obtained by dissolving a cellulose raw material in a liquid including an ionic liquid from a spinneret and wet-spinning or dry-wet-spinning cellulose by bringing the discharged cellulose solution into contact with a solidification liquid, and the solidification liquid flows along the discharging direction of the cellulose solution discharged from the spinneret.

Hereinafter, the preferred production method for the purified cellulose fibers used in the present invention will also be described.

The purified cellulose fiber of the present invention is produced by extruding a cellulose solution obtained by dissolving a cellulose raw material in an ionic liquid to be a fiber shape and spinning cellulose by bringing the extruded cellulose solution into contact with the solidification liquid. As the spinning method, the wet spinning or the dry wet spinning method is used.

In the present invention, the cellulose raw material is not particularly limited as long as it contains cellulose and it may be a cellulose raw material derived from plants, a cellulose raw material derived from animals, a cellulose raw material derived from microorganisms, or a regenerated cellulose raw material.

Examples of the cellulose raw material derived from plants include unprocessed cellulose raw materials derived from natural plants such as wood, cotton, hemp, and other plants, and processed cellulose raw materials derived from plants that were subjected to a preliminary processing such as rice straw, bagasse, pulp, wood powder, wood chips, and paper products.

Examples of the natural plant include a conifer, a hardwood, a monocot, a dicotyledon, and a bamboo.

Examples of the cellulose raw material derived from animals include a cellulose material derived from a sea squirt.

Examples of the cellulose raw material derived from microorganisms include a cellulose raw material produced by microorganisms belonging to *Aerobacter, Acetobacter, Achromobacter, Agrobacterium, Alacaligenes, Azotobacter, Pseudomonas, Rhizobium,* or *Sarcina.*

Examples of the regenerated cellulose raw material include the cellulose raw materials obtained by regenerating cellulose raw materials derived from plants, animals, or microorganisms described above by a known method such as a viscose method.

Among these, as the cellulose raw material in the present invention, pulp which is favorably dissolved in a polar solvent or an ionic liquid is preferable.

The dissolving pulp is preferably obtained by purifying wood chips. Though the components included in wood are dependent on the species of wood, the components are cellulose of 40% by weight to 60% by weight, hemicellulose of 10% by weight to 30% by weight, and lignin of 15% by weight to 30% by weight.

The main component of the purified polysaccharide fiber of the present invention preferably consists of two or more types of polysaccharides. As the raw material of the purified polysaccharide fiber, a polysaccharide raw material including two or more types of polysaccharides may be used, or plural types of polysaccharide raw materials including one type of polysaccharide may be used.

The combination of the polysaccharide is not particularly limited, and is formed by suitably selecting from among those described above. A combination of cellulose and hemicellulose is preferable, and the first main component is more preferably cellulose.

In the present invention, in all components constituting the purified polysaccharide fiber, the proportion of the first main component is 97% by weight or less, and more preferably 90% by weight or less.

In a case where the main component of the purified polysaccharide fiber of the present invention is a combination of cellulose and hemicellulose, strength of the fiber tends to be decreased by including the hemicellulose component. From the viewpoint of suppressing the decrease in the strength, in all components constituting the purified polysaccharide fiber, the proportion of the total of cellulose and hemicellulose is preferably 90% by weight or greater.

From the point of view of resource saving, the proportion (hereinafter, referred to as a resource usage rate) of the purified polysaccharide fiber of the present invention obtained from the polysaccharide raw material is preferably 60% by weight or greater, more preferably 70% by weight or greater, and particularly preferably 80% by weight or greater.

For example, it is possible to obtain the purified polysaccharide fiber of the present invention of 60 g or greater from pulp of 100 g.

It was made clear that in a case of manufacturing a purified cellulose fiber as the purified polysaccharide fiber of the present invention, even when the proportion of the cellulose component in all the components constituting the purified cellulose fiber is not 98% by weight or greater, a fiber having high strength can be obtained. For this reason, according to the present invention, it is possible to increase the resource usage rate.

From the viewpoint of the balance of the resource usage rate and the strength in the purified polysaccharide fiber, the proportion of hemicellulose in all components constituting the purified polysaccharide fiber is preferably 0.1% by weight to 40% by weight, and more preferably 0.1% by weight to 20% by weight.

In the present invention, before dissolving the polysaccharide raw material including cellulose and the like in a liquid including a polar solvent or an ionic liquid, it is possible to pretreat the polysaccharide raw material or the cellulose raw material for the purpose of improving the solubility in the ionic liquid. As the specific pretreatment, it is possible to perform a drying treatment, a physical pulverization treatment such as pulverization or grinding, or a chemical modification treatment with an acid or an alkali. All of these can be performed by common techniques.

As the polar solvent used in the present invention, a polar solvent having the ability to dissolve by solvating polysaccharides, in particular, hardly soluble cellulose among the polysaccharides is preferable.

Among these, a solvent having high polarizability is considered to have high ability to solvate. As a degree of polarization, μ of dipolar molecules (N-methylmorpholine-N-oxide or the like) is 3 to 6, and μ of zwitterionic molecules is greater than 10 whereas μ of neutral apolar molecules (cyclohexane or the like) is about 0. Here, μ represents a dipole moment.

As the polar solvent, dipolar molecules or zwitterionic molecules are preferable, and N-methylmorpholine-N-oxide (NMMO) is more preferable.

In the present invention, the ionic liquid is a liquid at 100° C. or lower, consists of only ions, and is a solvent in which a cationic moiety, an anionic moiety, or both of them are constituted with organic ions. In the present invention, an ionic liquid preferable from the viewpoint of polysaccharide solubility, a decrease in the molecular weight of the polysaccharide when the polysaccharide is dissolved, and the concentration, the melting point, the thermal stability, and the safety of the ionic liquid is selected.

The ionic liquid is preferably formed of a cationic moiety and an anionic moiety, the cationic moiety of the ionic liquid is not particularly limited, and it is possible to use an cationic moiety generally used in the cationic moiety of the ionic liquid.

Among these, preferable examples of the cationic moiety of the ionic liquid of the present invention include a nitrogen-containing aromatic ion, an ammonium ion, and a phosphonium ion.

Specific examples of the nitrogen-containing aromatic cation include a pyridinium ion, a pyridazinium ion, a pyrimidinium ion, a pyrazinium ion, an imidazolium ion, a pyrazonium ion, an oxazolium ion, a 1,2,3-triazolium ion, a 1,2,4-triazolium ion, a thiazolium ion, a piperidinium ion, and a pyrrolidinium ion.

Among these, as the nitrogen-containing aromatic cation, an imidazolium ion and a pyrimidinium ion are preferable, an imidazolium ion is more preferable, and an imidazolium ion represented by the following general formula (C3) is particularly preferable.

[Chem. 11]

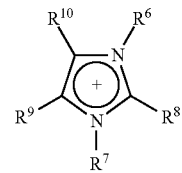

(C3)

[In the formula, each of $R^6$ and $R^7$ independently represents an alkyl group having 1 to 10 carbon atoms or an alkenyl group having 2 to 10 carbon atoms, and each of $R^8$ to $R^{10}$ independently represents a hydrogen atom or an alkyl group having 1 to 10 carbon atoms.]

In the formula (C3), each of $R^6$ and $R^7$ independently represents an alkyl group having 1 to 10 carbon atoms or an alkenyl group having 2 to 10 carbon atoms.

The alkyl group having 1 to 10 carbon atoms may be any one of a linear alkyl group, a branched alkyl group, and a cyclic alkyl group, a linear alkyl group or a branched alkyl group is preferable, and a linear alkyl group is more preferable.

Specific examples of the linear alkyl group include a methyl group, an ethyl group, a propyl group, a butyl group, a pentyl group, a hexyl group, a heptyl group, an octyl group, a nonyl group, and a decyl group.

Specific examples of the branched alkyl group include a 1-methylethyl group, a 1,1-dimethylethyl group, a 1-methylpropyl group, a 2-methylpropyl group, a 1,1-dimethylpropyl group, a 2,2-dimethylpropyl group, a 1-methylbutyl group, a 2-methylbutyl group, a 3-methylbutyl group, a 1-methylpentyl group, a 2-methylpentyl group, a 3-methylpentyl group, and 4-methylpentyl group.

The cyclic alkyl group may be a monocyclic group or a polycyclic group. Specific examples thereof include monocyclic groups such as a cyclopropyl group, a cyclobutyl group, a cyclopentyl group, a cyclohexyl group, a cycloheptyl group, and a cyclooctyl group; and polycyclic groups such as a norbornyl group, an adamantyl group, and an isobornyl group.

The number of carbon atoms of the alkyl groups in $R^6$ and $R^7$ is preferably 1 to 8.

As the alkenyl group having 2 to 10 carbon atoms, an alkenyl group obtained by substituting a single bond of carbon-carbon with a double bond in an alkyl group having 2 to 10 carbon atoms can be exemplified, and as preferred examples, a vinyl group, an allyl group, and the like can be exemplified. Moreover, the position of the double bond is not particularly limited.

The number of carbon atoms of the alkenyl groups in $R^6$ and $R^7$ is preferably 2 to 8.

In addition, $R^6$ and $R^7$ may be the same as or different from each other.

In the formula (C3), each of $R^8$ to $R^{10}$ independently represents a hydrogen atom or an alkyl group having 1 to 10 carbon atoms.

The alkyl group having 1 to 10 carbon atoms may be any one of a linear alkyl group, a branched alkyl group, and a cyclic alkyl group, a linear alkyl group or a branched alkyl group is preferable, and a linear alkyl group is more preferable. Here, as a linear alkyl group, a branched alkyl group, and a cyclic alkyl group, the same alkyl groups as the alkyl groups of $R^6$ and $R^7$ described above can be exemplified.

The number of carbon atoms of the alkyl group in $R^8$ to $R^{10}$ is preferably 1 to 6 and more preferably 1 to 3, and $R^8$ to $R^{10}$ is most preferably a hydrogen atom.

In addition, $R^8$ to $R^{10}$ may be the same as or different from each other.

A preferable specific example of the imidazolium ion represented by the formula (C3) is shown by the following formula (C1).

[Chem. 12]

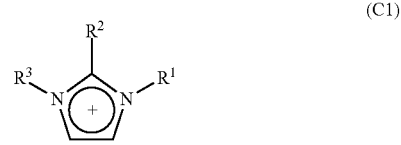

(C1)

[In the formula, $R^1$ represents an alkyl group having 1 to 4 carbon atoms or an alkenyl group having 2 to 4 carbon atoms, $R^2$ represents a hydrogen atom or a methyl group, and $R^3$ represents an alkyl group having 1 to 8 carbon atoms or an alkenyl group having 2 to 8 carbon atoms.]

In addition, preferable specific examples of the imidazolium ion represented by the formula (C1) are shown by the following formulas (C1-1) to (C1-3).

[Chem. 13]

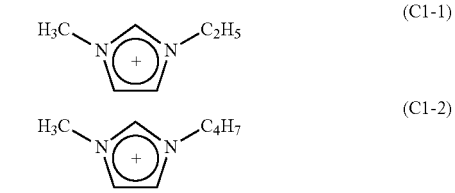

(C1-1)

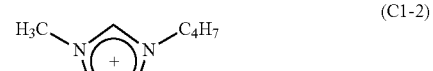

(C1-2)

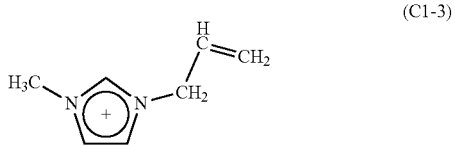

(C1-3)

It is preferable that $R^1$ and $R^3$ be short chains from the viewpoint that by increasing hydrophilicity, absorption into the body becomes hard and safety is increased. However, in a case where $R^1$ and $R^3$ are methyl groups, the regularity of the molecules increases, and by this, the melting point increases, accordingly, the viscosity also tends to increase. In dissolution of the polysaccharide, it is necessary to penetrate an ionic liquid into fiber, and thus the melting point and the viscosity of the ionic liquid used are preferably low.

Therefore, it is particularly preferable that $R^1$ be a methyl group and $R^3$ be an ethyl group.

In addition, since $R^2$ affects the solubility of the polysaccharide, $R^2$ is preferably a hydrogen atom.

Therefore, among the above-described formulas (C1-1) to (C1-3), a 1-ethyl-3-methylimidazolium ion represented by the formula (C1-1) is preferable.

A phosphonium ion is not particularly limited as long as it has a "$P^+$", and as preferable specific examples, phosphonium ions represented by the general formula "$R_4P^+$ (each of a plurality of Rs independently represents a hydrogen atom or a hydrocarbon group having 1 to 30 carbon atoms.)" can be exemplified.

The hydrocarbon group having 1 to 30 carbon atoms may be an aliphatic hydrocarbon group or an aromatic hydrocarbon group.

The aliphatic hydrocarbon group is preferably a saturated hydrocarbon group (alkyl group), and the alkyl group may be any one of a linear alkyl group, a branched alkyl group, and a cyclic alkyl group.

The linear alkyl group preferably has 1 to 20 carbon atoms, and more preferably 1 to 16 carbon atoms. Specific examples thereof include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, and a hexadecyl group.

The branched alkyl group has 3 to 30 carbon atoms, preferably 3 to 20 carbon atoms, and more preferably 3 to 16 carbon atoms. Specific examples thereof include a 1-methylethyl group, a 1,1-dimethylethyl group, a 1-methylpropyl group, a 2-methylpropyl group, a 1,1-dimethylpropyl group, a 2,2-dimethylpropyl group, a 1-methylbutyl group, a 2-methylbutyl group, a 3-methylbutyl group, a 1-methylpentyl group, a 2-methylpentyl group, a 3-methylpentyl group, and 4-methylpentyl group.

The cyclic alkyl group has 3 to 30 carbon atoms, preferably 3 to 20 carbon atoms, and more preferably 3 to 16 carbon atoms, and may be a monocyclic group or a polycyclic group. Specific examples thereof include monocyclic groups such as a cyclopropyl group, a cyclobutyl group, a cyclopentyl group, a cyclohexyl group, a cycloheptyl group, and a cyclooctyl group; and polycyclic groups such as a norbornyl group, an adamantyl group, and an isobornyl group.

The aromatic hydrocarbon group preferably has 6 to 30 carbon atoms, and specific examples thereof include aryl groups such as a phenyl group, a 1-naphthyl group, a 2-naphthyl group, a biphenyl group, and a tolyl group, and aryl alkyl groups such as a benzyl group, a phenethyl group, a naphthylmethyl group, and a naphthylethyl group.

Here, a plurality of Rs in the general formula "$R_4P^+$" may be the same as or different from each other.

Among these, as a phosphonium ion, the cationic moiety represented by the following formula (C4) is preferable.

[Chem. 14]

(C4)

[In the formula, each of $R^{11}$ to $R^{14}$ independently represents an alkyl group having 1 to 16 carbon atoms.]

In the formula (C4), each of $R^{11}$ to $R^{14}$ independently represents an alkyl group having 1 to 16 carbon atoms. The alkyl group having 1 to 16 carbon atoms may be any one of a linear alkyl group, a branched alkyl group, and a cyclic alkyl group, a linear alkyl group or a branched alkyl group is preferable, and a linear alkyl group is more preferable. Here, as a linear alkyl group, a branched alkyl group, and a cyclic alkyl group, the same alkyl groups as those described above can be exemplified.

In addition, $R^{11}$ to $R^{14}$ may be the same as or different from each other, and three or more among $R^{11}$ to $R^{14}$ are preferably the same from the viewpoint of ease of availability.

Among these, in the present invention, as the alkyl group of $R^{11}$ to $R^{14}$, a linear alkyl group or a branched alkyl group having 1 to 14 carbon atoms is preferable, a linear alkyl group or a branched alkyl group having 1 to 10 carbon atoms is more preferable, a linear alkyl group or a branched alkyl group having 1 to 8 carbon atoms is still more preferable, and a linear alkyl group or a branched alkyl group having 1 to 4 carbon atoms is particularly preferable.

A preferable specific example of the cationic moiety represented by the formula (C4) is shown by the following formula (C5).

[Chem. 15]

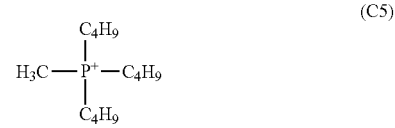

(C5)

In the present invention, the cationic moiety is more preferably one or more types selected from the group consisting of an imidazolium ion, a pyridinium ion, an ammonium ion, and a phosphonium ion, and an imidazolium ion is more preferable.

In the present invention, examples of the anionic moiety include a halogen ion, a carboxylate ion, a phosphinate ion, a phosphate ion, and a phosphonate ion. In addition, examples of the anionic moiety used in the production method for purified cellulose fibers of the present invention include a halogen ion, a carboxylate ion, and a phosphinate ion.

Examples of the halogen ion include a chloride ion, a bromide ion, and an iodide ion, and a chloride ion is preferable.

Examples of the carboxylate ion include a formate ion, an acetate ion, a propionate ion, a butyrate ion, a hexanoate ion, a maleate ion, a fumarate ion, an oxalate ion, a lectate ion, and a pyruvate ion, and a formate ion, an acetate ion, and a propionate ion are preferable.

Among these, the anionic moiety preferably has a compound including a phosphorus atom, and is more preferably any one of a phosphinate ion, a phosphate ion, and a phosphonate ion represented by the following general formula (C2).

[Chem. 16]

(C2)

[In the formula, each of $X^1$ and $X^2$ independently represents a hydrogen atom, a hydroxyl group, or an alkoxy group having 1 to 4 carbon atoms.]

Examples of the phosphate ion include a phosphate ion represented by the following general formula (A1).

[Chem. 17]

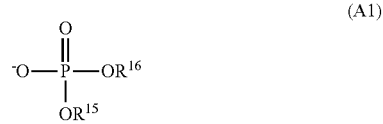

(A1)

[In the formula, each of $R^{15}$ and $R^{16}$ independently represents a hydrogen atom or an alkyl group.]

In the formula (A1), each of $R^{15}$ and $R^{16}$ independently represents a hydrogen atom or an alkyl group, the alkyl group may be any one of a linear alkyl group, a branched alkyl group, and a cyclic alkyl group, and a linear alkyl group or a branched alkyl group is preferable. The number of carbon atoms of the alkyl group of $R^{15}$ or $R^{16}$ is preferably 1 to 10, more preferably 1 to 6, and still more preferably 1 to 4, and an alkyl group having 1 or 2 carbon atoms is particularly preferable for industrial reasons.

$R^{15}$ and $R^{16}$ may be the same as or different from each other.

Among these phosphate ions, a dimethyl phosphate ion and a diethyl phosphate ion are preferable, and a diethyl phosphate ion is more preferable.

Examples of the phosphonate ion include a phosphonate ion represented by the following general formula (A2).

[Chem. 18]

(A2)

[In the formula, $R^{15}$ is the same as described above.]

In the formula (A2), $R^{15}$ is the same as $R^{15}$ in the formula (A1).

Among these phosphonate ions, a methyl phosphonate ion is preferable.

The phosphinate ion is represented by the following formula (A3).

[Chem. 19]

(A3)

In addition, examples of the phosphinate ion used in the production method for purified cellulose fibers of the present invention include a phosphinate ion represented by the following general formula (A4).

[Chem. 20]

(A4)

[In the formula, each of $R^{25}$ and $R^{26}$ independently represents a hydrogen atom, an alkyl group, or an alkoxy group.]

In the formula (A4), each of $R^{25}$ and $R^{26}$ independently represents a hydrogen atom, an alkyl group, or an alkoxy group, the alkyl group may be any one of a linear alkyl group, a branched alkyl group, and a cyclic alkyl group, and a linear alkyl group or a branched alkyl group is preferable. The number of carbon atoms of the alkyl group of $R^{25}$ or $R^{26}$ is preferably 1 to 10, more preferably 1 to 6, and still more preferably 1 to 4, and an alkyl group having 1 or 2 carbon atoms is particularly preferable for industrial reasons.

In addition, as an alkyl group constituting the alkoxy group, the same alkyl groups as the alkyl groups described above can be exemplified.

$R^{25}$ and $R^{26}$ may be the same as or different from each other.

Among these phosphinate ions, a methyl phosphinate ion, a methoxy phosphinate ion, or a phosphinate ion are preferable.

The ionic liquid used in the present invention is preferably an ionic liquid having a compound including a phosphorus atom in the anionic moiety. The ionic liquid having a compound including a phosphorus atom in the anionic moiety has low viscosity and a low melting point compared to a case where the anionic moiety is a halogen ion. Therefore, since cellulose is easily spun using the above-described ionic liquid, the ionic liquid is excellent.

The strength of fiber depends on not only the fiber structure but also the molecular weight of the polysaccharide. Therefore, when dissolving the polysaccharide in the ionic liquid, by selecting an ionic liquid having a slight decrease in the molecular weight of the polysaccharide, physical properties of fiber are further improved.

In a case of using the ionic liquid having a compound including a phosphorus atom in the anionic moiety, the molecular weight of the polysaccharide or fiber is less likely to decrease, and heat resistance is high (that is, thermal decomposition is less likely to occur at high temperatures) compared to a case where the anionic moiety is a carboxylate ion. Therefore, when spinning the polysaccharide using the above-described ionic liquid, it is possible to increase the spinning temperature. As a result, it is possible to ensure productivity of the purified polysaccharide fiber at a higher spinning temperature. For example, in a case where the anionic moiety is a carboxylate ion, under the conditions of the spinning temperature of 130° C. or higher, productivity of spinning the polysaccharide is decreased. However, in a case where the anionic moiety is a compound including a phosphorus atom, even under the high-temperature conditions of the spinning temperature of 150° C., productivity of spinning the polysaccharide can be maintained.

Furthermore, in a case of re-using the above-described ionic liquid having a compound including a phosphorus atom in the anionic moiety, the yield of reuse is high. In general, in a case of producing a purified polysaccharide fiber industrially, the ionic liquid that flows out when fiberizing a solution by making the solution pass through a solidification liquid is recycled. Recycling of the ionic liquid is performed by volatilizing liquid components other than the ionic liquid by distillation. At this time, since heat is applied to the ionic liquid, it is important that the ionic liquid has thermal stability, and the thermal stability of the ionic liquid affects the yield of the recycling.

Therefore, by using a compound including a phosphorus atom as the anionic moiety, it is possible to prevent an increase in the ionic liquid amount required to continuously produce a purified polysaccharide fiber, and materials and energy required to produce the ionic liquid.

In addition, as other anionic moieties, a pseudohalogen can also be exemplified. The pseudohalogen has similar characteristics to those of a halogen ion. Examples of the pseudohalogen include a cyanate ion, an oxocyanate ion, a thiocyanate ion, and a selenocyanate ion.

In an embodiment of the present invention, the anionic moiety is more preferably one or more types of ions selected from the group consisting of chloride, formate, acetate, propionate, a diethyl phosphate ion, a methyl phosphonate ion, and a phosphinate ion. In addition, in the production method for purified cellulose fibers of the present invention, the anionic moiety is more preferably one or more types of ions selected from the group consisting of chloride, formate, acetate, propionate, methyl phosphinate, methoxy phosphinate, and phosphinate, and is particularly preferably a chloride ion and an acetate ion.

The ionic liquid in the present invention is preferably constituted with the cationic moiety and the anionic moiety described above. In the combination of the cationic moiety and the anionic moiety, the anionic moiety preferably has one or more types selected from the group consisting of a phosphinate ion, a phosphate ion, and a phosphonate ion represented by the above general formula (C2), and it is possible to suitably select the anionic moiety capable of appropriately dissolving the polysaccharide raw material or the cellulose raw material.

Examples of the preferred ionic liquid include 1-allyl-3-methyl imidazolium chloride (AmimCl), 1-ethyl-3-methylimidazolium acetate (C2mimAc), 1-ethyl-3-methylimidazolium diethylphosphate (C2mimDEP, C2mim(EtO)2PO2), 1-ethyl-3-methylimidazolium methylphosphonate (C2mimMEP, C2mimMeOHPO2), 1-butyl-3-methylimidazolium acetate (C4mimAc), and 1-ethyl-3-methyl imidazolium phosphinate (C2mimHPO, C2mimH2PO2). In addition, in the production method for purified cellulose fibers of the present invention, as a preferable ionic liquid, 1-butyl-3-methylimidazolium acetate, 1-ethyl-3-methylimidazolium acetate, and 1-allyl-3-methylimidazolium chloride can be exemplified, and as a more preferable ionic liquid, 1-ethyl-3-methylimidazolium acetate can be exemplified.

It was made clear that the ionic liquid has a slight decrease in the molecular weight of the polysaccharide by a method for dissolving the polysaccharide using the ionic liquid described below.

From the viewpoint of suppressing a decrease in the molecular weight of the polysaccharide in fiber, 1-ethyl-3-methylimidazolium acetate (C2mimAc), 1-ethyl-3-methylimidazolium diethylphosphate (C2mimDEP), 1-ethyl-3-methylimidazolium methylphosphonate (C2mimMEP), and 1-ethyl-3-methyl imidazolium phosphinate (C2mimHPO) are more preferable, and 1-ethyl-3-methylimidazolium diethylphosphate (C2mimDEP) is particularly preferable.

In the present invention, the distance D from a place where the polysaccharide solution is extruded to be a fiber shape to a place where the extruded polysaccharide solution is in contact with the solidification liquid is preferably 50 mm to 120 mm.

The viscosity of the ionic liquid described above is preferably low. Specifically, the viscosity of the ionic liquid at 100° C. is preferably 0.2 mPa·s to 1,000 mPa·s, more preferably 0.5 mPa·s to 600 mPa·s, and particularly preferably 1.0 mPa·s to 400 mPa·s. In addition, the viscosity of the ionic liquid at 80° C. is preferably 0.5 mPa·s to 1,200 mPa·s, more preferably 0.7 mPa·s to 800 mPa·s, and particularly preferably 1.0 mPa·s to 500 mPa·s.

In a case of using an ionic liquid having high viscosity, it is difficult to dissolve a polysaccharide raw material in the ionic liquid. In a case where dissolution of the polysaccharide raw material is difficult, since undissolved polysaccharide raw material occurs in a large amount, clogging of the filter occurs during spinning. As a result, productivity is decreased. In addition, if the above-described undissolved polysaccharide raw material is mixed in fiber, this becomes a destruction nucleus of the fiber. As a result, the quality of the fiber is decreased. In contrast, in a case of using an ionic liquid having low viscosity, when dissolving a polysaccharide raw material in the ionic liquid, the polysaccharide raw material is likely to penetrate into the ionic liquid. For this reason, it is possible to easily dissolve the polysaccharide in the ionic liquid.

In the present invention, the amount of the ionic liquid used, which is not particularly limited, is preferably 8% by weight to 30% by weight, and more preferably 10% by weight to 25% by weight as the concentration of a polysaccharide raw material in a polysaccharide solution. In a case where the concentration of polysaccharide is too low, since a large amount of the ionic liquid is released in a solidification process, fiber having a lot of cavities is formed, and thus, it is difficult to become a dense fiber and it is difficult for the fiber to have strength. In contrast, in a case where the concentration of polysaccharide is too high, it is not possible to completely dissolve the polysaccharide.

In the present invention, a liquid which dissolves a polysaccharide raw material including cellulose and the like includes the above-described ionic liquid.

The liquid may or may not contain a liquid component other than the ionic liquid. Specific examples of the liquid component other than the ionic liquid include an organic solvent.

The organic solvent is not particularly limited as long as it is a solvent other than the ionic liquid, and it is possible to be suitably selected in consideration of compatibility with the ionic liquid, viscosity, and the like.

Among these, the organic solvent is preferably one or more types selected from the group consisting of an amide-based solvent, a sulfoxide-based solvent, a nitrile-based solvent, a cyclic ether-based solvent, and an aromatic amine-based solvent.

Examples of the amide-based solvent include N,N-dimethylformamide, N,N-dimethylacetamide, 1-methyl-2-pyrrolidone, and 1-vinyl-2-pyrrolidone.

Examples of the sulfoxide-based solvent include dimethyl sulfoxide and hexamethylene sulfoxide.

Examples of the nitrile-based solvent include acetonitrile, propionitrile, and benzonitrile.

Examples of the cyclic ether-based solvent include 1,3-dioxolane, tetrahydrofuran, tetrahydropyran, 1,3-dioxane, 1,4-dioxane, and 1,3,5-trioxane.

Examples of the aromatic amine-based solvent include pyridine and the like.

In a case of using these organic solvent, the mixing weight ratio of the ionic liquid and the organic solvent is preferably 6:1 to 0.1:1, more preferably 5:1 to 0.2:1, and still more preferably 4:1 to 0.5:1. When the mixing weight ratio is in the above range, it is possible to form a solvent that easily swells a polysaccharide raw material.

The amount of the organic solvent used, which is not particularly limited, is preferably 1 part by weight to 30 parts by weight, more preferably 1 part by weight to 25 parts by weight, and still more preferably 3 parts by weight to 20 parts by weight with respect to 1 part by weight of the polysaccharide raw material. When the amount of the organic solvent used is in the above range, it is possible to form a polysaccharide solution having suitable viscosity.

By using an organic solvent as described above in combination with the ionic liquid, the solubility of a polysaccharide raw material is further improved, and thus it is preferable.

In the present invention, a method for dissolving a polysaccharide raw material in a liquid including the ionic liquid is not particularly limited, and for example, it is possible to obtain a polysaccharide solution by bringing the liquid including the ionic liquid into contact with the polysaccharide raw material and heating or stirring as necessary.

The method of bringing the liquid including the ionic liquid into contact with the polysaccharide raw material is not particularly limited, and for example, the polysaccharide raw material may be added to the liquid including the ionic liquid, or the liquid including the ionic liquid may be added to the polysaccharide raw material or a cellulose raw material.

In a case of heating when dissolving, the heating temperature is preferably 30° C. to 200° C., more preferably 70° C. to 180° C., and particularly preferably 70° C. to 150° C. By heating, the solubility of the polysaccharide raw material is further improved, and thus it is preferable.

The method for stirring is not particularly limited, and for example, the liquid including the ionic liquid and the polysaccharide raw material may be mechanically stirred using a stirrer, a stirring blade, or a stirring bar, or after putting and sealing the liquid including the ionic liquid and the polysaccharide raw material in an airtight container, stirring may be performed by shaking the container. In addition, the liquid including the ionic liquid and the polysaccharide raw material may be dissolved by an extruder or a kneader having a single axis or plural axes. The stirring time is not particularly limited, and stirring is preferably performed until the polysaccharide raw material is appropriately dissolved.

In addition, in a case where the liquid including the ionic liquid includes an organic solvent in addition to the ionic liquid, the organic solvent and the ionic liquid may be mixed in advance, the organic solvent may be added thereto to dissolve after mixing the ionic liquid and the polysaccharide raw material, and the ionic liquid may be added thereto to dissolve after mixing the organic solvent and the polysaccharide raw material including cellulose.

Among these, it is preferable that a mixed solution be produced by mixing the organic solvent and the ionic liquid in advance. At this time, the organic solvent and the ionic liquid are stirred so as to be uniformly mixed while heating at 70° C. to 180° C. for about 5 minutes to 30 minutes, and it is preferable to mix until the liquid including the ionic liquid becomes uniform.

The polysaccharide solution by the ionic liquid obtained in this manner may include a filler such as a carbon nanotube, clay, or silica, or an additive such as a surfactant or an antioxidant, if necessary.

The method for dissolving polysaccharide using the ionic liquid described above has a disadvantage in that versatility is poor since the viscosity of the ionic liquid is very high.

The present inventors have found that the problem caused by high viscosity of the ionic liquid used is eliminated by diluting the polysaccharide solution obtained using a halogen ion as an anion of the ionic liquid with a lithium complex salt solution.

According to the method, the ionic liquid is able to dissolve a large amount of polysaccharide. Dissolution of cellulose as polysaccharide in the ionic liquid may be performed by bringing the cellulose into contact with the ionic liquid at 80° C. to 110° C. for about 2 hours to 8 hours, and more preferably, at 80° C. to 90° C. for about 3 hours to 5 hours.

Then, the obtained polysaccharide solution is diluted with a lithium complex salt solution. By this, the polysaccharide hydrated by the ionic liquid forms a complex with lithium, and thus becomes soluble in a solvent.

As a result, since the dilution is possible by only being left to stand and shake, work is simplified and shortened. In addition, according to the method for dissolving the polysaccharide, it is possible to reduce the amount of the ionic liquid used to one hundredth or less of the amount used in the art, and thus, the method is excellent from the viewpoint of cost.

As the cation of the ionic liquid, a cation having an imidazolium skeleton described above is preferable. As specific examples of the cation having an imidazolium skeleton, cations of the ionic liquid having a methylimidazolium skeleton such as a 1-ethyl-3-methylimidazolium ion, a 1-n-propyl-3-methylimidazolium ion, a 1-n-butyl-3-methylimidazolium ion, a 1-n-pentyl-3-methylimidazolium ion, a 1-n-hexyl-3-methylimidazolium ion, a 1-n-octyl-3-methylimidazolium ion, a 1-ethyl-2,3-dimethylimidazolium ion, a 1-n-butyl-2,3-dimethylimidazolium ion, and a 1-allyl-3-methylimidazolium ion are more preferable, and a 1-n-butyl-3-methylimidazolium ion is particularly preferable.

In addition, as the anion of the ionic liquid, halogen ions such as a fluoride ion, a chloride ion, a bromide ion, and an iodide ion are preferable, and a chloride ion is more preferable.

As a combination of these anions and cations, 1-n-butyl-3-methylimidazolium chloride is preferable. Furthermore, a mixed solution of 1-n-butyl-3-methylimidazolium chloride and dimethylacetamide is preferably used. By this, it is possible to reduce the viscosity of the ionic liquid and to improve the solubility. Moreover, in consideration of the solubility of polysaccharide, in particular, cellulose in the ionic liquid, the amount of dimethylacetamide in the mixed solution is preferably 25% by mass to 50% by mass.

In addition, as the lithium complex in a lithium complex salt solution used for diluting a polysaccharide solution, lithium halides such as lithium fluoride, lithium chloride, lithium bromide, and lithium iodide are preferable. This is because the ionic liquid that dissolves the polysaccharide is substituted by a lithium complex salt, and dissolved by interaction of lithium ion-polysaccharide hydroxyl group. Among these, lithium chloride is more preferable.

In addition, as the solvent of the lithium complex salt solution, it is possible to use a solvent that forms a complex with lithium ion and can dissolve the polysaccharide by interaction with the polysaccharide hydroxyl group, and dimethylacetamide is preferable. As the concentration of the lithium complex salt in the lithium complex salt solution, is preferably 0.5% by mass to 10% by mass.

After solidifying polysaccharide by bringing the polysaccharide solution obtained as described above into contact with a solidification liquid which is a liquid other than the polysaccharide solution, the polysaccharide can be spun by the dry wet spinning or the wet spinning described above. In addition, it is also possible to produce a polysaccharide solid by solidifying the polysaccharide. In a case of producing fiber using the polysaccharide solid, the polysaccharide can be spun by a known spinning method such as the dry wet spinning or the wet spinning.

The spinning method such as the wet spinning or the dry wet spinning is not particularly limited, and it is possible to spin the polysaccharide by a known spinning method.

The dry wet spinning, in general, is a method in which a polysaccharide solution discharged into a gas from a spinneret is introduced into a solidification bath which holds a solidification liquid, and then the polysaccharide is spun, and the wet spinning is a method in which the polysaccharide discharged from a spinneret disposed in a solidification bath is spun.

In addition, a film can also be produced using the polysaccharide solid, and in this case, the polysaccharide is solidified by bringing the polysaccharide solution discharged to be a sheet shape from a die into contact with the solidification liquid. There is no limitation to the production method for producing a film.

The solidification bath means a bath in which the solidification liquid for solidifying polysaccharide is held. As the solidification liquid, one or more types selected from the group consisting of a polar solvent and the ionic liquid described above are preferably exemplified.

Examples of the polar solvent include water, tetrahydrofuran, acetone, acetonitrile, N,N-dimethylformamide, dimethylsulfoxide, acetic acid, 1-butanol, 2-propanol, 1-propanol, ethanol, methanol, and formic acid.

When wet-spinning or dry-wet-spinning polysaccharide, the polysaccharide is solidified from the outside of the fiber, and thus, in a case of viewing the fiber from the cross-sectional direction, there is a tendency that the difference of structures between the inside and the outside of the fiber is likely to be generated (a so-called skin-core structure is likely to be generated). As the difference of structures between the inside and the outside is small, the structure of fiber becomes nearly uniform, and thus, stress concentration is less likely to occur in the fiber, and it is possible to obtain high strength.

In order to reduce the difference of structures between the inside and the outside, it is necessary to control the solidification rate of the polysaccharide. In a case where the solidification rate is too fast, the structure of the fiber becomes a skin-core structure, and in a case where the solidification rate is too slow, solidification of the polysaccharide becomes imperfect.

The solidification of the polysaccharide occurs when the polysaccharide comes into contact with the solidification liquid which is a poor solvent instead of the ionic liquid which is a good solvent in the solution of the polysaccharide. By the degree of immobilization ability of the poor solvent, the solidification rate is controlled.

In the present invention, when the solidification liquid includes the ionic liquid described above, it is possible to control the solidification rate of the polysaccharide. The ionic liquid in the polysaccharide solution and the ionic liquid in the solidification liquid is preferably the same type.

The ionic liquid in the present invention preferably includes a recycled product recovered from the solidification liquid used when separately producing a purified polysaccharide fiber. The recycling rate of the ionic liquid is 90% by weight or greater, preferably 93% by weight or greater, more preferably 95% by weight or greater, and particularly preferably 98% by weight. The recycling rate significantly affects the productivity of fibers, and thus, the recycling rate is preferably high as much as possible.

In the present invention, the recycling rate of the ionic liquid refers to the weight ratio of the recycled products of the ionic liquid used when separately producing a purified polysaccharide fiber in the total weight of the ionic liquid used in the production method for the purified polysaccharide of the present invention.

As the upper limit value and the lower limit value of the concentration of the ionic liquid in a first solidification bath, the following values can be exemplified. Moreover, in a case of using a single solidification bath, "first solidification bath" refers to the solidification bath, and in a case of using a plurality of solidification baths, "first solidification bath" refers to a first solidification bath used in a spinning process.

In an embodiment of the present invention in which the ionic liquid includes a recycled product, the lower limit value of the concentration of the ionic liquid in the solidification liquid is preferably 20% by weight. In the present invention, in a case where the concentration of the ionic liquid in the solidification liquid is less than 20% by weight, it was made clear that the recycling rate is significantly decreased at the time of recovering the ionic liquid from the solidification liquid used when separately producing the purified polysaccharide fiber.

The upper limit value of the concentration of the ionic liquid in the solidification liquid is preferably 70% by weight, more preferably 50% by weight, still more preferably 40% by weight, and particularly preferably 30% by weight.

The lower limit value of the concentration of the ionic liquid in the solidification liquid is preferably 0.4% by weight, more preferably 1% by weight, still more preferably 10% by weight, and particularly preferably 20% by weight.

As the concentration of the ionic liquid in the solidification liquid is increased, the cross-sectional shape of the fiber deviates from a true circle, and the circularity of the fiber becomes poor. This is because in the process of producing the fiber, fiber comes into contact with a roller or the like before the fiber is sufficiently solidified, and thus, the shape thereof is broken. When the cross-sectional shape deviates from a true circle, the stress concentration occurs in the fiber, and thus, the strength of the fiber is decreased.

As a combination of the type of the ionic liquid and the concentration of the ionic liquid, the solidification liquid preferably contains 1-ethyl-3-methylimidazolium diethylphosphate (C2mimDEP), 1-ethyl-3-methylimidazolium methylphosphonate (C2mimMEP), or 1-ethyl-3-methylimidazolium phosphinate (C2mimHPO) of 0.4% by weight to 50% by weight.

In addition, the solidification liquid more preferably contains 1-ethyl-3-methylimidazolium diethylphosphate (C2mimDEP), 1-ethyl-3-methylimidazolium methylphosphonate (C2mimMEP), or 1-ethyl-3-methylimidazolium phosphinate (C2mimHPO) of 1% by weight to 40% by weight.

Moreover, the solidification liquid particularly preferably contains 1-ethyl-3-methylimidazolium diethylphosphate (C2mimDEP) of 10% by weight to 30% by weight.

In the present invention, a purified polysaccharide fiber is preferably obtained by a method in which a plurality of solidification baths is disposed, from upstream toward downstream of a process of spinning the polysaccharide using the plurality of solidification baths which holds the solidification liquid, such that the concentration of the ionic liquid in the solidification liquid which is held is sequentially lowered, an intermediate of the purified polysaccharide fiber is obtained by spinning the polysaccharide in the polysaccharide solution using the solidification bath of the uppermost upstream, and the intermediate is spun by sequentially using the other solidification baths toward downstream.

Hereinafter, an embodiment of the production method for purified polysaccharide fibers of the present invention will be described with reference to FIG. 1.

FIG. 1 is a schematic cross-sectional view illustrating a method of dry-wet-spinning polysaccharide. In the embodiment, the dry wet spinning will be described, however the spinning method is not particularly limited, and the spinning method may be the wet spinning.

First, a polysaccharide solution obtained by dissolving in an ionic liquid described above is discharged from a spinneret 2 disposed in an extruder 1. The extruder 1 may be either a single-screw extruder or a twin-screw extruder. The polysaccharide is spun by bringing the polysaccharide solution discharged from the spinneret 2 into contact with a first solidification liquid 6 in a first solidification bath 5 which is a solidification bath of the uppermost upstream, whereby an intermediate 7 of polysaccharide fiber is obtained. After bringing into contact with a roller 3 disposed to change the running direction of the intermediate 7, the intermediate 7 is brought into contact with a withdrawal roller 4, and is sent to a second solidification bath 15 which is a solidification bath downstream.

The concentration of the ionic liquid in a second solidification liquid 16 which is held by the second solidification bath 15 is set so as to be lower than the concentration of the ionic liquid in the first solidification liquid 6 which is held by the first solidification bath 5. By bringing the intermediate 7 sent from the first solidification bath 5 into contact with the second solidification liquid 16 in the second solidification bath 15 through the withdrawal roller 4, the intermediate 7 is further spun (immobilization), whereby an intermediate 7a is obtained. After bringing the intermediate 7a into contact with the roller 3, the intermediate 7a is brought into contact with the withdrawal roller 4, and is sent to a third solidification bath 25 which is a solidification bath downstream.

The concentration of the ionic liquid in the third solidification liquid 26 which is held by the third solidification bath 25 is set so as to be lower than the concentration of the ionic liquid in the second solidification liquid 16 which is held by the second solidification bath 15, and by bringing the intermediate 7a into contact with the third solidification liquid 26 in the third solidification bath 25, the intermediate 7a is further spun (immobilization), whereby an intermediate 7b is obtained. By bringing the intermediate into contact with the solidification liquids in a plurality of solidification bath, the intermediate is slowly spun (immobilization), and by this, finally, a purified polysaccharide fiber having a little difference of structures between the inside and the outside of the fiber is produced.

In this manner, by using the solidification bath constituted with multistage baths, the solidification rate of the polysaccharide is suitably controlled, and thus, physical properties of the fiber become good. As the number of stages of the solidification bath, five stages or less is preferable, and three stages or less is more preferable in view of production facilities.

The preferred concentration of the ionic liquid in the solidification liquid is as described above.

In a case where the concentration of the ionic liquid in the solidification liquid is 70% by weight or greater, if the retention time of the polysaccharide or the intermediate in the solidification bath is not significantly increased, it is not possible to mold the fiber.

In the embodiment, from the viewpoint of maintaining the strength of the fiber, the retention time of the polysaccharide or the intermediate in all of the solidification baths is preferably 300 seconds or less.

In addition, in the embodiment, from the viewpoint of productivity, the retention time of the polysaccharide or the intermediate in all of the solidification baths is preferably 120 seconds or less.

In addition, in the process of spinning, since a large amount of a spinning solution (polysaccharide solution) is continuously supplied to the solidification bath, the concentration of the ionic liquid in the solidification liquid tends to be increased. In a case where the concentration of the ionic liquid in the solidification liquid is less than 0.4% by weight, a large amount of water or an organic solvent is required to be supplied to the solidification bath, and it is not favorable from the viewpoint of productivity.

In a case of using the solidification bath constituted with multistage baths, the relationship of the concentration $X_n$ of the ionic liquid in the $n^{th}$ solidification bath and the concentration $X_{n+1}$ in the $n+1^{th}$ bath preferably satisfies $X_{n+1} \leq 0.8X_n$, more preferably satisfies $X_{n+1} \leq 0.6X_n$, and particularly preferably satisfies $X_{n+1} \leq 0.4X_n$ (moreover, $X_n$ is preferably 20% by weight or greater).

The solidification liquid is preferably a liquid consisting of an ionic liquid and water and/or an organic solvent, or one or more types selected from the group consisting of water, a polar solvent, and the ionic liquid described above. The organic solvent is preferably a polar solvent, and examples of the polar solvent include tetrahydrofuran, acetone, acetonitrile, N,N-dimethylformamide, dimethylsulfoxide, acetic acid, 1-butanol, 2-propanol, 1-propanol, ethanol, methanol, and formic acid. In a case where the carbon number of alcohol and the carbon number of ketone are the same, the solidification rate is the order of water>alcohol>ketone, and a substance having a small carbon number has a high solidification rate. By suitably combining these, it is possible to control the solidification rate. From the viewpoint of not slowing the solidification rate too much, alcohol or ketone having 5 or less carbon atoms is preferable.

In addition, the solidification rate of the polysaccharide can also be controlled by the temperature of the solidification bath. In a case of using a plurality of solidification baths, the temperatures of all solidification baths are preferably controlled. The temperatures of the solidification liquids in all solidification baths are preferably 5° C. to 60° C., more preferably 10° C. to 40° C., and particularly preferably 20° C. to 40° C. In a case where the temperature of the solidification liquid is 5° C. or higher, there is no concern that the solidification liquid with water is partially frozen. In a case where the temperature of the solidification liquid is 60° C. or lower, the amount of evaporation of the solidification liquid is not too large, it is not necessary to supply water or an organic solvent to the solidification liquid uselessly, and productivity is not excessively decreased.

In the present invention, from the viewpoint of an effective use of resources, an ionic liquid recovered from the solidification liquid used when separately producing the purified polysaccharide fiber is preferably reused (recycling).

For this reason, the ionic liquid in the solidification liquid preferably has excellent thermal stability as the ionic liquid in the polysaccharide solution, and 1-ethyl-3-methylimidazolium diethylphosphate (C2mimDEP) is particularly preferable. As the thermal stability of the ionic liquid in the solidification liquid is higher, the thermal decomposition of the ionic liquid is suppressed, and thus, it is possible to reduce the amount of the ionic liquid required to produce the fiber, and it is possible to improve the productivity.

The recycling method is not particularly limited, and an ion exchange resin method, an ion exchange membrane method, a spray dry method, and the like are exemplified, and a spray dry method is preferable. The spray dry method is preferably also used with respect to an ionic liquid in which the quantity of heat received by a recovered ionic liquid is small, and which has low heat resistance and is likely to be thermally decomposed.

As described above, since the purified polysaccharide fibers of the present invention is obtained by using a liquid including a polar solvent or an ionic liquid, the purified polysaccharide fibers of the present invention is produced without a chemical reaction as in the viscose method. For this reason, in the production process, there are no adverse effects on physical properties of fiber. Therefore, the purified polysaccharide fibers of the present invention maintain high strength.

In addition, since the ionic liquid has better dissolving ability than a polar solvent, the purified polysaccharide fiber obtained by using the ionic liquid is a uniform fiber, and maintains high strength.

The strength TB of the purified polysaccharide fiber obtained in this manner is preferably 5.1 cN/dtex or greater, and more preferably 5.4 cN/dtex or greater.

Next, an embodiment of the production method for purified polysaccharide fibers of the present invention will be described with reference to FIG. 2.

Figure 2:
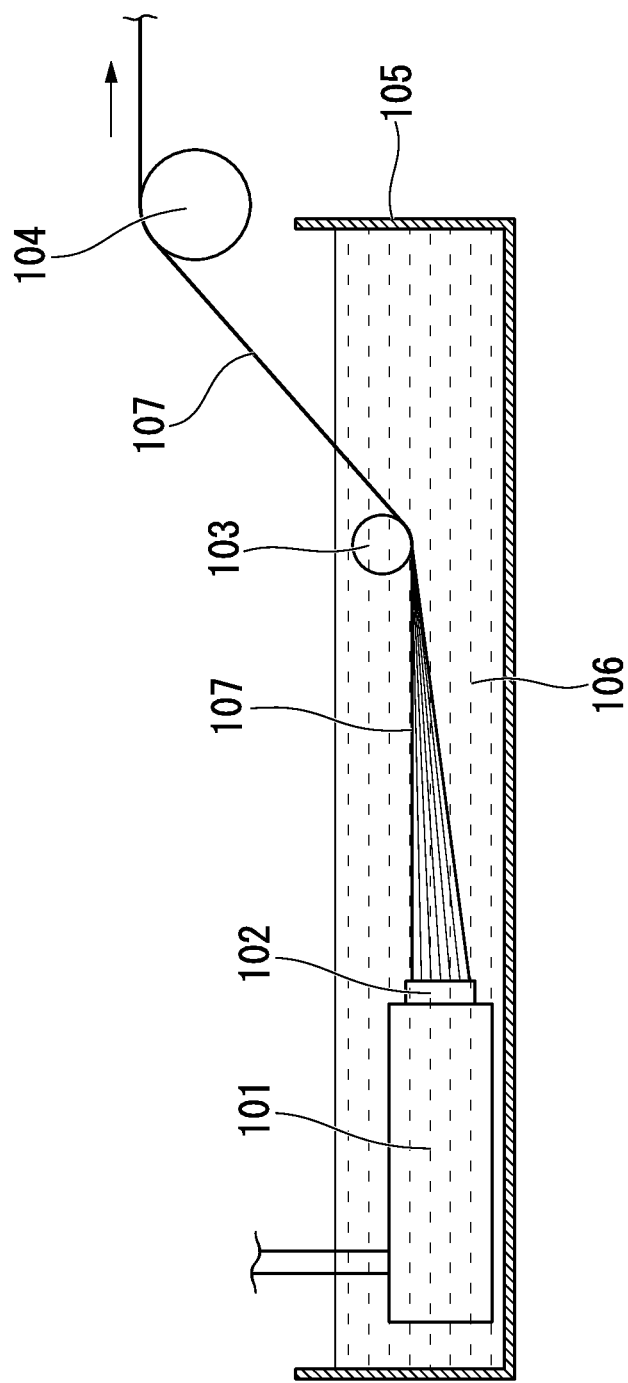
FIG. 2 is a schematic cross-sectional view illustrating a method for wet-spinning a polysaccharide.

FIG. 2 is a schematic cross-sectional view illustrating a method of wet-spinning polysaccharide. In the embodiment, the wet spinning will be described, however the spinning method is not particularly limited, and the spinning method may be the dry wet spinning.

A polysaccharide solution obtained by dissolving in an ionic liquid described above is discharged from a spinneret 102 disposed in an extruder 101. The extruder 101 may be either a single-screw extruder or a twin-screw extruder. The polysaccharide is spun by bringing the polysaccharide solution discharged from the spinneret 102 into contact with a solidification liquid 106 in a solidification bath 105, whereby a polysaccharide fiber 107 is obtained. After bringing the polysaccharide fiber 107 into contact with a roller 103 disposed to change the running direction of the polysaccharide fiber 107, the polysaccharide fiber 107 is brought into contact with a withdrawal roller 104, and is sent to the next process.

In the embodiment, the roller 103 is disposed in the solidification bath 105, however, the disposition is not particularly limited, and the roller 103 may be disposed either in a contact state or non-contact state with the liquid surface on the liquid surface of the solidification bath 105.

In the embodiment, a dynamic friction coefficient between the roller 103 and the polysaccharide fiber 107 is 0.05 to 0.35. Here, the dynamic friction coefficient is a value measured by the following measurement method.

While applying a tension of 0.353 cN/dtex to polysaccharide fiber wound on a cylinder having a diameter of 25 mm of which the surface which is a friction body was manufactured from the same material as a guide or a roller, the angle of the incoming direction and the outgoing of direction toward the friction body of the polysaccharide fiber was adjusted to 90°, and the dynamic friction coefficient μ of the polysaccharide fiber when being frictionized at a speed of 100 m/min in an atmosphere of 25° C. and 65% RH is determined according to the following formula.

$$\mu = \frac{360 \times 2.3026}{2\pi\theta} \times \log_{10}\left(\frac{T_2}{T_1}\right)$$ [Equation 1]

T1: Tension of the entry side to the friction body (tension corresponding to 0.353 cN per 1 dtex)
T2: Tension of the exit side from the friction body
θ: 90°
π: Circular constant In a case where the dynamic friction coefficient is greater than 0.35, in the production process, thread breakage or fluff of the polysaccharide fiber occurs, and thus, the productivity of the polysaccharide fiber and the quality of the polysaccharide fiber are adversely affected.

In a case where the dynamic friction coefficient is less than 0.05, in the production process, the running polysaccharide fiber is derailed from the running line, and thus, the productivity of the polysaccharide fiber is adversely affected.

The roller 103 is preferably formed of a metal, a fluorine-containing resin, or ceramic. In a case where the roller 103 is disposed in the solidification bath 105, the corrosion resistance with respect to the solidification liquid 106 is required, and thus, a fluorine-containing resin or ceramic is more preferably exemplified.

In addition, in a case where the roller 103 has a heating function and can dry the polysaccharide fiber 107, since the temperature is easily managed, a metal is more preferably exemplified.

Examples of the metal include stainless steel, nickel, and titanium.

Examples of the fluorine-containing resin include polytetrafluoroethylene and polyvinylidene fluoride.

Examples of the ceramic include aluminum oxide, zirconium oxide, titanium oxide, magnesium oxide, silicon nitride, aluminum nitride, and silicon carbide.

In addition, the surface of the roller 103 is coated with the above-described metal, fluorine-containing resin, or ceramic, and the portions other than the surface may be formed of a material other than these.

Moreover, here, the case where the running direction of the polysaccharide fiber is changed by the roller was described, however, instead of the roller, any one that has a guide function of adjusting the direction in a contact state with the fiber can also be used.

Next, an embodiment of the production method for purified cellulose fibers will be described.

Figure 3:
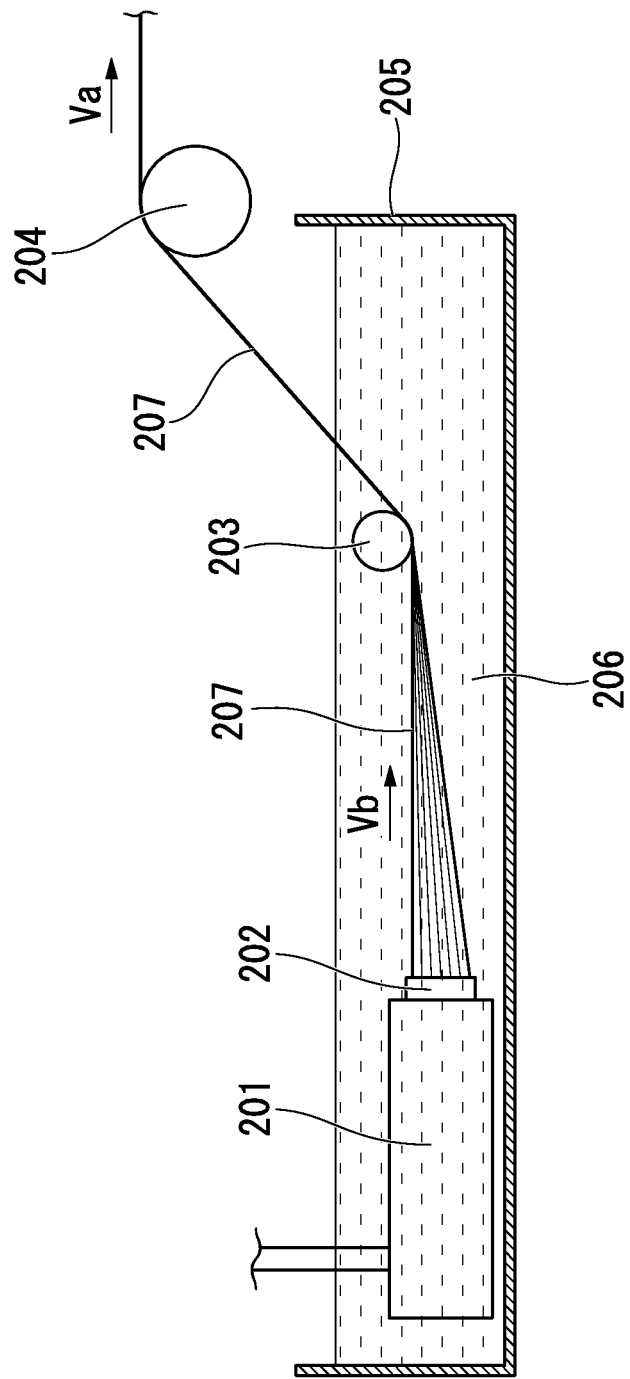
FIG. 3 is a schematic cross-sectional view illustrating an embodiment for wet-spinning cellulose.

FIG. 3 is a schematic cross-sectional view illustrating a first embodiment for wet-spinning cellulose.

A cellulose solution obtained by dissolving a liquid including an ionic liquid described above is discharged from a spinneret 202 disposed in an extruder 201. The extruder 201 may be either a single-screw extruder or a twin-screw extruder. The cellulose is solidified by bringing the cellulose solution discharged from the spinneret 202 into contact with a solidification liquid 206 in a solidification bath 205, whereby a purified cellulose fiber 207 is obtained. After bringing the purified cellulose fiber 207 into contact with a roller 203 disposed to change the running direction of the purified cellulose fiber 207, the purified cellulose fiber 207 is brought into contact with a withdrawal roller 204, and is sent to the next process.

In the embodiment, the roller 203 is disposed in the solidification bath 205, however, the disposition is not particularly limited, and the roller 203 may be disposed either in a contact state or non-contact state with the liquid surface on the liquid surface of the solidification bath 205.

Moreover, here, the case where the running direction of the purified cellulose fiber is changed by the roller was described, however, instead of the roller, any one that has a guide function of adjusting the direction in a contact state with the purified cellulose fiber can also be used.

In the embodiment, the solidification liquid 206 flows in the solidification bath 205 along the discharging direction of the cellulose solution discharged from the spinneret 202. That is, in the production process, the angle between the speed Va at which the purified cellulose fiber 207 is wound and the flow speed Vb at which the solidification liquid 206 flows in the solidification bath 205 is preferably 45° or less, more preferably 15° or less, and particularly preferably 0°. As a result, friction between the purified cellulose fiber 207 and the solidification liquid 206 is not increased, and there is no concern that breakage occurs in the purified cellulose fiber 207.

In addition, the flow speed Vb at which the solidification liquid 206 flows in the solidification bath 205 is preferably 10% to 90% of the speed Va at which the purified cellulose fiber 207 is wound through the withdrawal roller 204, and more preferably 30% to 80% of the speed Va. When the flow speed Vb is 10% or greater of the speed Va, friction between the solidification liquid 206 and the purified cellulose fiber 207 is not increased, and the thread breakage is further suppressed. When the flow speed Vb is 90% or less of the speed Va, the water flow in the solidification bath 205 becomes stable, and a uniform purified cellulose fiber 207 can be easily obtained.

Furthermore, in a case of strengthening the purified cellulose fiber 207, since it is desirable to spin cellulose at a high speed, the flow speed Va is preferably 50 m/min or greater, more preferably 80 m/min or greater, and particularly preferably 120 m/min or greater.

When the flow speed Va and the flow speed Vb satisfy the two conditions, it is possible to obtain purified cellulose fiber having excellent strength.

Figure 4:
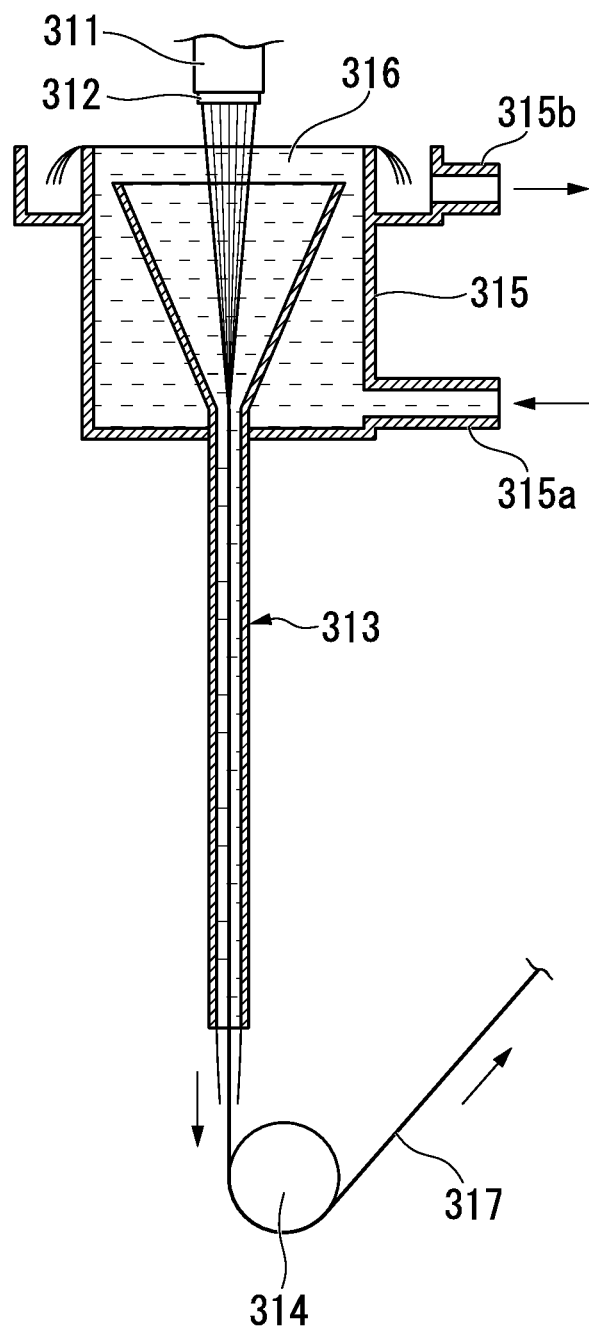
FIG. 4 is a schematic cross-sectional view illustrating an embodiment for dry-wet-spinning cellulose.

FIG. 4 is a schematic cross-sectional view illustrating a second embodiment for dry-wet-spinning cellulose.

The cellulose solution obtained by dissolving a cellulose raw material in an ionic liquid described above is discharged from a spinneret 312 disposed in an extruder 311. The extruder 311 may be either a single-screw extruder or a twin-screw extruder. The cellulose solution discharged from the spinneret 312 is spun in the air once, and then is immersed in the solidification liquid 316 filled in the solidification bath 315. The cellulose is solidified by this, a purified cellulose fiber 317 is obtained, and the purified cellulose fiber 317 is guided to a flow pipe 313.

Here, the solidification liquid 316 in the solidification bath 315 is supplied from a supply pipe 315a. Apart of the solidification liquid 316 is emitted from an emission pipe 315b, however, most of the solidification liquid 316 is dropped through the flow pipe 313. The purified cellulose fiber 317 runs in accordance with the free fall of the solidification liquid 316. As a result, friction between the purified cellulose fiber 317 and the solidification liquid 316 is not increased, and there is no concern that breakage occurs in the purified cellulose fiber 317.

[Apparatus for Producing Polysaccharide Solid]

Next, an embodiment of an apparatus for producing polysaccharide solids of the present invention will be described with reference to FIG. 5.

Figure 5:
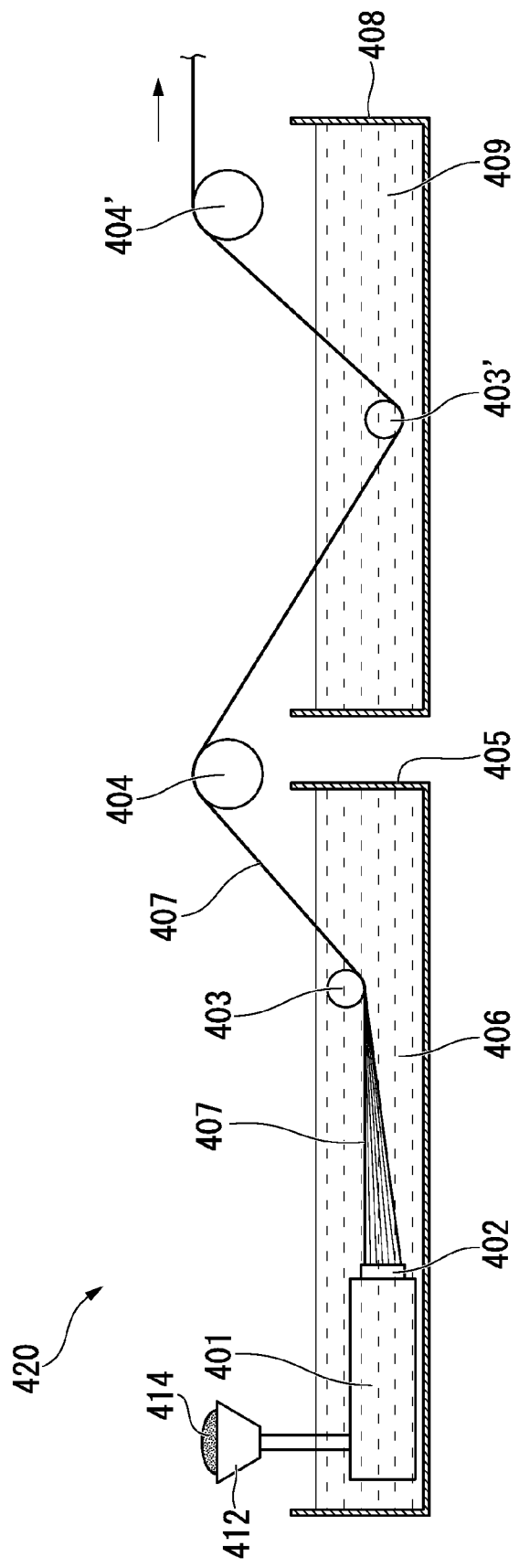
FIG. 5 is a schematic cross-sectional view illustrating an apparatus that produces a polysaccharide solid in an embodiment of the present invention.

As shown in FIG. 5, an apparatus 420 for producing polysaccharide solids of the embodiment is equipped with a dissolution apparatus 412 for manufacturing a polysaccharide solution, a discharger 401, a solidification bath 405, and a cleaning bath 408. The apparatus 420 for producing polysaccharide solids of the embodiment has a constitution for producing fiber using a polysaccharide solid.

More specifically, the apparatus 420 for producing polysaccharide solids of the embodiment has a constitution for wet-spinning polysaccharide, however, may also have a constitution for dry-wet-spinning.

Figure 6:
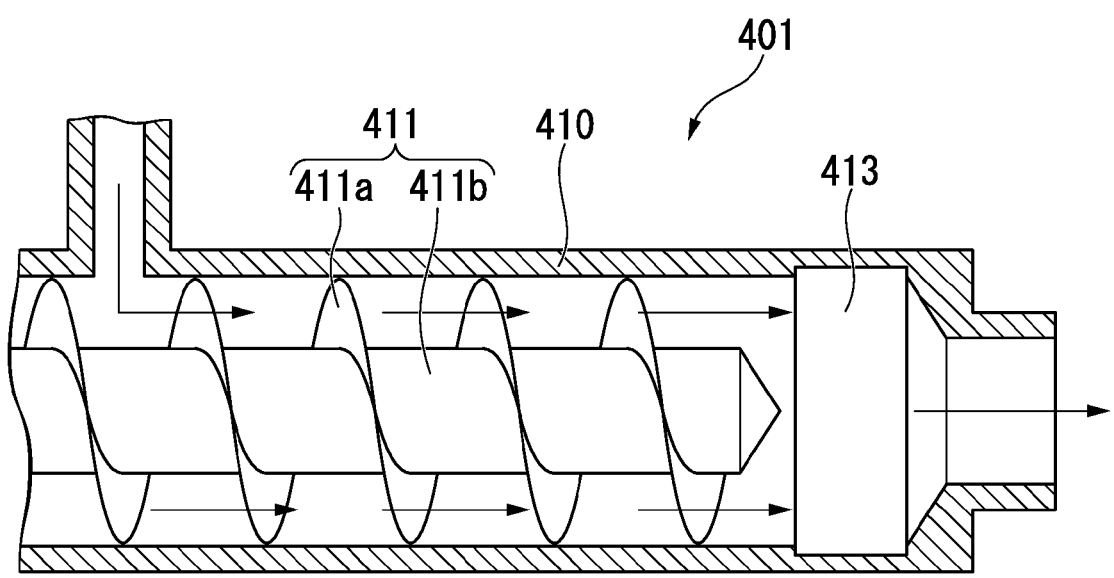
FIG. 6 is a schematic cross-sectional view illustrating a constitution of a discharger in an embodiment of the present invention.

FIG. 6 is a cross-sectional diagram illustrating a constitution of a discharger 401 in the embodiment. In a cylinder 410 of the discharger 401, a single screw 411 in which a flight scraper 411a is attached to a screw axis 411b is equipped, and by the rotation of the single screw 411, the polysaccharide solution is extruded in the axial direction, and a gear pump 413 is adjusted such that only a determined amount of the extruded polysaccharide solution is discharged.

Moreover, the discharger 401 in the embodiment is a single-screw extruder, and may be a multi-screw extruder. The extrusion method is not limited and any means may be used.

As shown in FIG. 5, in the dissolution apparatus 412, a polysaccharide raw material 414 is dissolved in a liquid including an ionic liquid, and the resultant product is sent to the discharger 401 as a polysaccharide solution. The polysaccharide is spun by bringing the polysaccharide solution discharged from a discharge opening 402 of the discharger 401 into contact with a solidification liquid 406 in a solidification bath 405, whereby a polysaccharide fiber 407 is obtained. After bringing the polysaccharide fiber 407 into contact with a roller 403 disposed to change the running direction of the polysaccharide fiber 407, the polysaccharide fiber 407 is brought into contact with a withdrawal roller 404, and is sent to the next process.

The dissolution apparatus 412 may have or may not have a stirring function. In the embodiment, the dissolution apparatus 412 is shown as a different constitution from the discharger 401, however, in a case where the discharger 401 also serves as the dissolution apparatus, the discharger 401 becomes the dissolution apparatus 412.

In the embodiment, the roller 403 is disposed in the solidification bath 405, however, the disposition is not particularly limited, and the roller 203 may be disposed either in a contact state or non-contact state with the liquid surface on the liquid surface of the solidification bath 405.

Next, the polysaccharide fiber 407 is passed through the cleaning bath 408, and is cleaned by a cleaning solution 409 in the cleaning bath 408.

The cleaning solution 409 is not particularly limited as long as it has a low solubility to the polysaccharide fiber 407 and removes impurities, and typically, water or warm water is used. After bringing the cleaned polysaccharide fiber 407 into contact with a roller 403' disposed to change the running direction of the polysaccharide fiber 407, the cleaned polysaccharide fiber 407 is brought into contact with a withdrawal roller 404', and is sent to the next process.

Moreover, the roller 403' has the same shape as the roller 403 disposed in the solidification bath 405.

In the embodiment, the contact portions of the ionic liquid such as internal parts of the dissolution apparatus 412, internal parts of the discharger 401, the gear pump 413, the discharge opening 402, the solidification bath 405, and the cleaning bath 408 have corrosion resistance with respect to the ionic liquids described above. Here, the internal parts of the discharger 401 mean the single screw 411 and the like constituting the inside of the cylinder 410 of the discharger 401 shown in FIG. 6. Since these are always in contact with the ionic liquid in the process of producing the polysaccharide fiber 407, by having corrosion resistance, it is possible to suppress deterioration of the apparatus 420 for producing polysaccharide solids and maintain the productivity of the polysaccharide fiber 407.

As the material having corrosion resistance with respect to the ionic liquid, a material having a corrosion rate of 0.5 mm/year or less with respect to the ionic liquid is preferable. The corrosion rate is a corrosion rate measured by the method disclosed in Japanese Patent No. 4478392, and specifically, the corrosion rate is obtained by a method in which the above-described ionic liquid is filled in a test vessel made of silver, the material is immersed therein for 14 days, then the removed thickness is measured, and the corrosion rate is calculated in terms of mm/year.

In addition, the contact portions of the ionic liquid may be coated with a material having the corrosion rate of 0.5 mm/year or less with respect to the ionic liquid. When the contact portions have the corrosion resistance, it is possible to suppress deterioration of the apparatus 420 for producing polysaccharide solids and maintain the productivity of the polysaccharide fiber 407.

Examples of the material having the corrosion rate of 0.5 mm/year or less with respect to the ionic liquid include metals such as stainless steel, nickel, and titanium; fluorine-containing resins such as polytetrafluoroethylene and polyvinylidene fluoride; and ceramics such as aluminum oxide, zirconium oxide, titanium oxide, magnesium oxide, silicon nitride, aluminum nitride, and silicon carbide.

For example, using such an apparatus for producing polysaccharide solids, it is possible to efficiently produce polysaccharide fibers.

By using the rubber-fiber complex obtained by using the purified polysaccharide fiber having excellent strength in a carcass ply, a belt ply, or a belt-protecting layer, it is possible to obtain a high performance tire. Among these, the rubber-fiber complex of the present invention is preferably used in a carcass ply, and it is possible to obtain a tire having excellent pressure resistance and side cut resistance.

In addition, the using position in the tire is not particularly limited. The rubber-fiber complex may be used in at least one of a carcass ply, a belt ply, and a belt-protecting layer, and the rubber-fiber complex can also be used in both of a carcass ply, a belt ply, and a belt-protecting layer, or in all of a carcass ply, a belt ply, and a belt-protecting layer.

As a cord made of the polysaccharide fiber, a single twist structure formed of a single filament bundle which was twisted, a double twist structure combined by second twisting two filament bundles which was first twisted, or a multi-twist structure combined by second twisting two or more filament bundles which was first twisted is adopted. The fineness per one cord is preferably 1,000 dtex to 10,000 dtex, more preferably 1,400 dtex to 6,000 dtex, and still more preferably 1,400 dtex to 4,000 dtex. When using a cord of less than 1,000 dtex, it is necessary to increase the number of a carcass in order to keep the tire strength, and thus, cost of tire production is increased. When using a cord of greater than 10,000 dtex, the thickness of the carcass layer is increased more than necessary, and thus, the tire weight is increased.

The twist coefficient of a cord is preferably 0.20 to 0.80, more preferably 0.30 to 0.80, still more preferably 0.40 to 0.70, and particularly preferably 0.50 to 0.70.

The twist coefficient tan θ is obtained by the following equation.

$$\tan\theta = T\sqrt{0.125 \times \frac{D}{\rho}} \times 10^{-3}$$ [Equation 2]

D: Total number of dtex
P: Cord specific gravity
T: Number of twists (times/cm)

[Fiber-Rubber Complex]

The purified polysaccharide fiber or the cord is subjected to a dipping treatment by being immersed in a general adhesive such as resorcin-formalin-latex (RFL), and a heat treatment constituted with a drying process and a baking process is performed. A dipped cord manufactured in the manner was combined with a rubber material such as coating rubber, or topped with coating rubber, whereby a fiber-rubber complex is manufactured.

[Film-Rubber Complex]

In a case where the polysaccharide solid produced by using the apparatus that produces a polysaccharide solid of the present invention is a film, by using a film-rubber complex obtained by using the film in the inner liner layer, it is possible to obtain a high performance tire. By the inner liner layer, it is possible to prevent air leakage of a tire, and maintain a constant air pressure of the tire. The number of film sheets of the inner liner layer is not limited, and may be a single layer of only one sheet, or may be a plurality of layers of two or more sheets.

As the production method for the film-rubber complex, the following method can be exemplified.

In the same manner as in the fiber-rubber complex, a film is subjected to a dipping treatment by being immersed in a general adhesive such as resorcin-formalin-latex (RFL), and a heat treatment constituted with a drying process and a baking process is performed, and the film is topped with coating rubber, whereby a film-rubber complex is manufactured.

For example, the rubber used in rubber-fiber complex and the film-rubber complex of the present invention is obtained from natural rubber (NR), synthetic rubber having a carbon-carbon double bond, or a rubber composition obtained by blending two or more of these. Alternatively, in the fiber-rubber complex and the film-rubber complex of the present invention, for example, natural rubber (NR), synthetic rubber having a carbon-carbon double bond, or a rubber composition obtained by blending two or more of these is used as a rubber composition.

Examples of the synthetic rubber include polyisoprene rubber (IR), polybutadiene rubber (BR), and polychloroprene rubber which are homopolymers of conjugated diene compounds such as isoprene, butadiene, and chloroprene; styrene-butadiene copolymer rubber (SBR), vinylpyridine-butadiene-styrene copolymer rubber, acrylonitrile-butadiene copolymer rubber, acrylic acid-butadiene copolymer rubber, methacrylic acid-butadiene copolymer rubber, methylacrylate-butadiene copolymer rubber, and methylmethacrylate-butadiene copolymer rubber which are copolymers of the conjugated diene compounds and styrene, and copolymers of vinyl compounds and acrylonitrile, vinyl pyridine, acrylic acid, methacrylic acid, alkyl acrylates, and alkyl methacrylates; copolymers of olefins such as ethylene, propylene, and isobutylene and diene compounds [for example, isobutylene-isoprene copolymer rubber (IIR)]; copolymers (EPDM) of olefins and non-conjugated dienes [for example, an ethylene-propylene-cyclopentadiene terpolymer, an ethylene-propylene-5-ethylidene-2-norbornene terpolymer, and an ethylene-propylene-1,4-hexadiene terpolymer]; and ring-opened polymers of norbornene such as halides of these various rubbers, for example, chlorinated isobutylene-isoprene copolymer rubber (Cl-IIR), brominated isobutylene-isoprene copolymer rubber (Br-IIR), or the like.

It is possible to blend a saturated elastic body such as polyalkenamer obtained by ring-opening polymerization of cycloolefin [for example, polypentenamer], rubber obtained by ring-opening polymerization of oxirane ring [for example, polyepichlorohydrin rubber which can be sulfur-vulcanized], and polypropylene oxide rubber with the synthetic rubber.

In the rubber composition used in the present invention, sulfur, an organic sulfur compound, and other crosslinking agents are mixed in preferably 0.01 parts by weight to 10 parts by weight, and more preferably 1 part by weight to 5 parts by weight with respect to 100 parts by weight of the rubber component, and a vulcanization accelerator is mixed in preferably 0.01 parts by weight to 10 parts by weight, and more preferably 0.5 part by weight to 5 parts by weight with respect to 100 parts by weight of the rubber component. In this case, the type of the vulcanization accelerator is not limited, and by using of dibenzothiazyl sulfide (DM), diphenyl guanidine (D), or the like, it is possible to shorten a vulcanizing time.

In addition, for example, mineral oils such as a paraffin-based oil, a naphthene-based oil, an aromatic process oil, a cooligomer of ethylene-α-olefin, a paraffin wax, and liquid paraffin; or vegetable oils such as a castor oil, a cottonseed oil, a linseed oil, a rapeseed oil, a soybean oil, a palm oil, a coconut oil, and a peanut oil may be added to the rubber composition used in the present invention.

Furthermore, according to the common method, a compounding agent commonly used in the rubber industry, that is, a filler such as carbon black, silica, calcium carbonate, calcium sulfate, clay, or mica; a vulcanization accelerator such as zinc oxide or stearic acid; or an antioxidant may be added to the rubber composition used in the present invention depending on the purpose, use, or the like.

The tire of the present invention can be manufactured by using the rubber-fiber complex and the film-rubber complex of the present invention through usual molding and a vulcanizing process.

EXAMPLES

Although the present invention will be described in further detail by showing the following examples, the present invention is not limited to the following examples.

[Manufacture of Multifilament]

After heating a polysaccharide solution obtained by dissolving cellulose in 1-ethyl-3-methylimidazolium acetate (C2AmimAc), 1-allyl-3-methylimidazolium chloride (AmimCl), or 1-ethyl-3-methylimidazolium diethylphosphate (C2mimDEP) to the spinning temperature in an extruder, the solution was extruded at a predetermined Air-gap distance to a solidification vessel (first stage coagulation vessel) including the same type of an ionic liquid as an ionic liquid in a spinning solution at a predetermined concentration, then, kept for a predetermined period of time, and cleaning and drying processes were performed, whereby multifilaments (fibers) of Examples 1 to 10 and Comparative Examples 1 to 9 shown in Tables 1 to 4 were obtained.

Moreover, the details of production conditions of the multifilaments (fibers) are shown in Tables 1 to 4.

The properties of the multifilament (fiber) of each of Examples and Comparative Example were measured by the following test method, and the results are shown in Tables 1 to 4.

(1) Strength and Break Elongation

For a fiber which was false-twisted four times per 10 cm, a tensile test was performed using a tensile testing machine under the conditions of 25° C. and 55% RH. Strength is obtained by dividing the breaking strength by the fineness, and breaking elongation is elongation at the time of breakage.

(2) Recycling Efficiency

In the multifilaments (fibers) of Examples 1 to 10 and Comparative Examples 1 to 9, a proportion of a weight ratio of recycled products of the ionic liquid used when separately producing a purified polysaccharide fiber in the total weight of the ionic liquid used in the production is defined as a recycling efficiency (%).

Since recycling is performed by evaporating water, the required quantity of heat is substantially proportional to the water concentration (100% by weight−concentration of % by weight of the ionic liquid) simply. Therefore, in order to obtain the same amount of the ionic liquid, one having lower water concentration requires less quantity of heat.

In Tables 1 to 4, the recycling efficiency of less than 0.4% was evaluated as X, the recycling efficiency of 0.4% or greater and less than 20% was evaluated as Δ, the recycling efficiency of 20% or greater was evaluated as O.

(3) Yield

In the production process of the multifilaments (fibers) of Examples 1 to 10 and Comparative Examples 1 to 9, a case where fiber was not able to be manufactured was evaluated as X, a case where fiber was able to be manufactured, however, in physical properties of fiber, a relationship of the strength TB (cN/dtex) and the break elongation EB (%) at 25° C. did not satisfy the following formula (1) or the frequency of breakage at the time of spinning was high was evaluated as Δ, and a case where the relationship of the strength TB (cN/dtex) and the break elongation EB (%) at 25° C. satisfied the following formula (1) was evaluated as O. The results are shown in Tables 1 to 4.

[Equation 3]

$$\frac{TB}{EB^{-0.52}} \geq 13 \tag{1}$$

TABLE 1

| | | | Comparative Example 1 | Comparative Example 2 | Comparative Example 3 | Comparative Example 4 | Comparative Example 5 |
|---|---|---|---|---|---|---|---|
| Polysaccharide | | | Cellulose | Cellulose | Cellulose | Cellulose | Cellulose |
| Spinning solution | Polysaccharide concentration | wt % | 10 | 10 | 10 | 10 | 10 |
| | Ionic liquid type | | C2mimDEP | C2mimDEP | C2mimDEP | C2mimDEP | C2mimDEP |
| First coagulation vessel | Liquid type | | Water | Water | Water | Water | Water |
| | Concentration | wt % | 0.2 | 0.6 | 0.2 | 0.6 | 20 |
| | Temperature | ° C. | 20 | 20 | 20 | 20 | 20 |
| Air-gap distance | | mm | 55 | 45 | 115 | 125 | 45 |
| Yield | | | O | O | Δ | X | O |
| Recycling efficiency | | | X | Δ | X | Δ | O |

TABLE 1-continued

|  |  |  | Comparative Example 1 | Comparative Example 2 | Comparative Example 3 | Comparative Example 4 | Comparative Example 5 |
|---|---|---|---|---|---|---|---|
| Physical properties of fiber | Strength | cN/dtex | 4.0 | 3.5 | 4.5 | — | 3.4 |
|  | Break elongation | % | 8.2 | 9.2 | 4.9 | — | 10.7 |

TABLE 2

|  |  |  | Comparative Example 6 | Comparative Example 7 | Comparative Example 8 | Comparative Example 9 |
|---|---|---|---|---|---|---|
| Polysaccharide Spinning solution |  |  | Cellulose | Cellulose | Cellulose | Cellulose |
|  | Polysaccharide concentration | wt % | 10 | 10 | 10 | 10 |
|  | Ionic liquid type |  | C2mimDEP | C2mimDEP | C2mimDEP | C2mimDEP |
| First coagulation vessel | Liquid type |  | Water | Water | Water | Water |
|  | Concentration | wt % | 40 | 65 | 75 | 75 |
|  | Temperature | °C. | 20 | 20 | 20 | 20 |
| Air-gap distance |  | mm | 45 | 45 | 55 | 115 |
| Yield |  |  | O | O | O | Δ |
| Recycling efficiency |  |  | O | O | O | O |
| Physical properties of fiber | Strength | cN/dtex | 2.7 | 2.5 | 2.7 | 2.6 |
|  | Break elongation | % | 9.1 | 8.0 | 7.5 | 5.1 |

TABLE 3

|  |  |  | Example 1 | Example 2 | Example 3 | Example 4 | Example 5 |
|---|---|---|---|---|---|---|---|
| Polysaccharide Spinning solution |  |  | Cellulose | Cellulose | Cellulose | Cellulose | Cellulose |
|  | Polysaccharide concentration | wt % | 10 | 10 | 10 | 10 | 10 |
|  | Ionic liquid type |  | C2mimDEP | C2mimDEP | C2mimDEP | C2mimDEP | C2mimDEP |
| First coagulation vessel | Liquid type |  | Water | Water | Water | Water | Water |
|  | Concentration | wt % | 0.6 | 0.6 | 25 | 25 | 35 |
|  | Temperature | °C. | 20 | 20 | 20 | 20 | 20 |
| Air-gap distance |  | mm | 55 | 115 | 55 | 115 | 115 |
| Yield |  |  | O | Δ | O | Δ | Δ |
| Recycling efficiency |  |  | Δ | Δ | O | O | O |
| Physical properties of fiber | Strength | cN/dtex | 5.1 | 6.3 | 6.1 | 6.6 | 6.4 |
|  | Break elongation | % | 11.2 | 7.6 | 10.9 | 10.0 | 10.2 |

TABLE 4

|  |  |  | Example 6 | Example 7 | Example 8 | Example 9 | Example 10 |
|---|---|---|---|---|---|---|---|
| Polysaccharide Spinning solution |  |  | Cellulose | Cellulose | Cellulose | Cellulose | Cellulose |
|  | Polysaccharide concentration | wt % | 10 | 10 | 10 | 10 | 10 |
|  | Ionic liquid type |  | C2mimDEP | C2mimDEP | C2mimDEP | C2mimAc | AmimCl |
| First coagulation vessel | Liquid type |  | Water | Water | Water | Water | Water |
|  | Concentration | wt % | 35 | 65 | 65 | 25 | 25 |
|  | Temperature | °C. | 20 | 20 | 20 | 20 | 20 |
| Air-gap distance |  | mm | 55 | 115 | 55 | 55 | 55 |
| Yield |  |  | O | Δ | O | O | O |
| Recycling efficiency |  |  | O | O | O | O | O |
| Physical properties of fiber | Strength | cN/dtex | 5.5 | 7.9 | 3.9 | 5.6 | 5.4 |
|  | Break elongation | % | 11.0 | 5.1 | 12.1 | 10.3 | 10 |

As shown in Tables 1 and 2, in Comparative Example 1 in which the concentration of the ionic liquid in the solidification liquid in the solidification bath (first coagulation vessel) is less than 0.4% by weight, the recycling efficiency is low, and the strength of the obtained purified polysaccharide fiber was low.

In addition, in Comparative Example 3 in which the concentration of the ionic liquid in the solidification liquid in the solidification bath is less than 0.4% by weight, the recycling efficiency is low, and the break elongation of the obtained purified polysaccharide fiber was low.

In addition, in Comparative Examples 8 and 9 in which the concentration of the ionic liquid in the solidification liquid in the solidification bath is greater than 70% by weight, the strength of the obtained purified polysaccharide fiber was low.

In addition, in Comparative Examples 2, 5, 6, and 7 in which an air-gap (the distance D from a place where the polysaccharide solution is extruded to be a fiber shape to a place where the extruded polysaccharide solution is in contact with the solidification liquid) is less than 50 mm, the strength of the obtained purified polysaccharide fiber was low.

In addition, in Comparative Example 4 in which the air-gap is greater than 120 mm, since it is not possible to spin the polysaccharide solution, it is not possible to obtain the purified polysaccharide fiber, and the yield thereof was poor.

In contrast, as shown in Tables 3 and 4, in Examples 1 to 10, the recycling efficiency was high, and the purified polysaccharide fiber having high strength and break elongation was obtained with a high yield.

[Manufacture of Multifilament]

After heating a polysaccharide solution obtained by dissolving cellulose in 1-ethyl-3-methylimidazolium acetate (C2AmimAc), 1-allyl-3-methylimidazolium chloride (AminCl), 1-ethyl-3-methylimidazolium diethylphosphate (C2mimDEP), 1-ethyl-3-methylimidazolium phosphinate (C2mimHPO), or 1-ethyl-3-methylimidazolium methylphosphonate (C2mimMEP) to the spinning temperature, the solution was extruded by an extruder in a solidification vessel or solidification bath including any ionic liquid described above at a predetermined concentration, then, kept for a predetermined period of time, and cleaning and drying processes were performed, whereby multifilaments (fibers) of Examples 11 to 21 and Comparative Example 10 shown in Tables 5 and 6 were obtained.

Moreover, the details of the production conditions of the multifilaments (fibers) are shown in Tables 5 and 6.

In Examples 11 to 21 and Comparative Example 10, polysaccharide was purified from the raw materials (raw materials including polysaccharide) described in Tables 5 and 6. Cellulose and hemicellulose were purified by a Kraft process. Chitin was purified by decalcification-treating exoskeleton of crustaceans such as crabs with hydrochloric acid and deproteinization-treating with an alkali.

The polysaccharide purified from the raw materials described in Tables 5 and 6 was dissolved in a mixed solution of 1-ethyl-3-methylimidazolium acetate (C2AmimAc), 1-allyl-3-methylimidazolium chloride (AminCl), 1-ethyl-3-methylimidazolium diethylphosphate (C2mimDEP), 1-ethyl-3-methylimidazolium phosphinate (C2mimHPO), 1-ethyl-3-methylimidazolium methylphosphonate (C2mimMEP), N-methylmorpholine-N-oxide (NMMO), or methyltributylphosphonium chloride (MBPCl) and dimethylacetamide (DMAc), whereby a polysaccharide solution was obtained. After heating the polysaccharide solution to the spinning temperature, the solution was extruded by an extruder in a solidification vessel, and cleaning and drying processes were performed, whereby multifilaments (fibers) of Examples 11 to 21 and Comparative Example 10 shown in Tables 5 and 6 were obtained.

The properties of the multifilament (fiber) of each of Examples and Comparative Example were measured by the following test method, and the results are shown in Tables 5 and 6. In addition, % by weight of each component in the multifilament (fiber) of each of Examples and Comparative Example are shown in Tables 5 to 6.

(1) Fineness

After 100 m of the fiber was collected, the collected fiber was dried at 130° C. for 30 minutes, and after cooling until the temperature in a dried desiccator becomes room temperature, weight was measured. Since 1 g per 10,000 m becomes 1 dtex, the fineness was calculated from the weight of 100 m.

(2) Strength and Break Elongation

For a fiber which was false-twisted four times per 10 cm, a tensile test was performed using a tensile testing machine under the conditions of 25° C. and 55% RH. Strength is obtained by dividing the breaking strength by the fineness, and breaking elongation is elongation at the time of breakage.

(3) Resource Usage Rate

In the multifilaments (fibers) of Examples 11 to 21 and Comparative Example 10, the weight of the fiber obtained when using the raw material of 100 was defined as the resource usage rate.

[Manufacture of Cord]

After first twisting the obtained multifilaments, two multifilaments were combined by second twisting, whereby a cord was manufactured. The numbers of the first twist and the second twist are shown in Tables 5 and 6.

[Manufacture of Dipped Cord]

The cord is subjected to a dipping treatment by being immersed in an adhesive such as RFL (resorcin-formalin-latex), and a heat treatment constituted with a drying process and a baking process is performed. The drying process was performed at 150° C., a tension of $1 \times 10^{-3}$ N/dtex for 150 seconds (Examples 11 to 21 and Comparative Example 10). After the drying step, the baking process was performed at the same temperature, the same time, and the same tension as those in the drying process, whereby a dipped cord was manufactured.

[Manufacture of Carcass Ply Material]

The dipped cord was calendered with coating rubber, whereby a carcass ply material was manufactured.

[Manufacture of Tire]

A tire of 185/60R14 (Examples 11 to 21 and Comparative Example 10) was manufactured using the dipped cord which was topped with the coating rubber through usual molding and a vulcanizing process.

The properties of the tire of each of Examples and Comparative Example were measured by the following test method, and the results are shown in Tables 5 and 6.

(1) Drum Durability

After adjusting a tire of each of Examples and Comparative Example to the maximum air pressure in the JIS standards in a room of 25±2° C. the tire was left to stand for 24 hours, and the air pressure was readjusted. A load of two times the maximum load in the JIS standards was applied to the tire, and a running test was performed at a speed 60 km/h on a drum having a diameter of about 1.7 m (Examples 11 to 21 and Comparative Example 10).

A running distance to a failure occurrence at this time was measured, and the running distance to a failure occurrence in the tire of Comparative Example 10 was defined as index 100. A tire having a larger index has a longer running distance to a failure occurrence, and has better durability at the time when a high load is applied.

TABLE 5

| | | Comparative Example 10 | Example 11 | Example 12 | Example 13 | Example 14 | Example 15 |
|---|---|---|---|---|---|---|---|
| Raw material | | Conifer | Conifer | Hardwood | Conifer | Hardwood | Monocot |
| First main component | | Cellulose | Cellulose | Cellulose | Cellulose | Cellulose | Cellulose |
| Second main component | | — | Hemicellulose | Hemicellulose | Hemicellulose | Hemicellulose | Hemicellulose |
| Third main component | | — | — | — | — | — | — |
| Weight of first main component in fiber | % | 97.8 | 80.9 | 96.1 | 81.1 | 96.7 | 68.6 |
| Weight of second main component in fiber | % | — | 16.4 | 1.0 | 16.1 | 0.1 | 29.6 |
| Weight of third main component in fiber | % | — | — | — | — | — | — |
| Weight of other component in fiber | % | 2.2 | 2.7 | 2.9 | 2.8 | 3.2 | 1.8 |
| Solvent | | NMMO | C2mimAc | C2mimDEP | NMMO | C2mimDEP | C2mimMEP |
| Strength | cN/dtex | 4.29 | 5.23 | 5.57 | 4.03 | 5.14 | 5.11 |
| Break elongation | % | 5.81 | 10.92 | 11.27 | 5.72 | 12.02 | 9.72 |
| Fineness | dtex | 1842 | 1839 | 1857 | 1864 | 1827 | 1799 |
| Cord structure | | 1840/2 | 1840/2 | 1840/2 | 1840/2 | 1840/2 | 1840/2 |
| Number of second twist | Times/10 cm | 47 | 47 | 47 | 47 | 47 | 47 |
| Number of first twist | Times/10 cm | 47 | 47 | 47 | 47 | 47 | 47 |
| Resource usage rate | % | 48 | 75 | 61 | 75 | 62 | 61 |
| Drum durabikity | INDEX | 100 | 155 | 160 | 100 | 160 | 140 |

TABLE 6

| | | Example 16 | Example 17 | Example 18 | Example 19 | Example 20 | Example 21 |
|---|---|---|---|---|---|---|---|
| Raw material | | Conifer + exoskeleton of crustaceans | Bagasse | Bamboo | Hardwood | Hardwood | Hardwood |
| First main component | | Cellulose | Cellulose | Cellulose | Cellulose | Cellulose | Cellulose |
| Second main component | | Hemicellulose | Hemicellulose | Hemicellulose | Hemicellulose | Hemicellulose | Hemicellulose |
| Third main component | | Chitin | — | — | — | — | — |
| Weight of first main component in fiber | % | 80.2 | 75.6 | 72.6 | 74.3 | 89.3 | 84.7 |
| Weight of second main component in fiber | % | 16.5 | 22.7 | 21.2 | 21.4 | 7.3 | 12.5 |
| Weight of third main component in fiber | % | 1.0 | — | — | — | — | — |
| Weight of other component in fiber | % | 2.3 | 1.7 | 6.2 | 4.3 | 3.4 | 2.8 |

TABLE 6-continued

|  |  | Example 16 | Example 17 | Example 18 | Example 19 | Example 20 | Example 21 |
|---|---|---|---|---|---|---|---|
| Solvent |  | C2inimDEP | AminCl | C2minHPO | MBP Cl + DMAc | C2mimDEP | C2miinDEP |
| Strength | cN/dtex | 4.30 | 4.83 | 5.03 | 4.57 | 5.41 | 5.30 |
| Break elongation | % | 5.93 | 10.92 | 12.48 | 8.34 | 11.27 | 12.32 |
| Fineness | dtex | 1842 | 1867 | 1823 | 1842 | 1859 | 1859 |
| Cord structure |  | 1840/2 | 1840/2 | 1840/2 | 1840/2 | 1840/2 | 1840/2 |
| Number of second twist | Times/10 cm | 47 | 47 | 47 | 47 | 47 | 47 |
| Number of first twist | Times/10 cm | 47 | 47 | 47 | 47 | 47 | 47 |
| Resource usage rate | % | 70 | 82 | 71 | 67 | 63 | 66 |
| Drum durability | INDEX | 105 | 145 | 160 | 120 | 155 | 165 |

As shown in Tables 5 and 6, in Examples 11 to 21, the strength and the break elongation of the purified polysaccharide fiber used were high, and as a result, good tire performance was obtained.

In contrast, in Comparative Example 10, since the strength and the break elongation of the purified polysaccharide fiber used were low, and the energy to cord break was low, good tire performance was not obtained. Furthermore, in Comparative Example 10, since only cellulose is used as the main component, the resource usage rate was low.

[Manufacture of Cellulose Fiber]

Cellulose solutions were manufactured by dissolving pulp in each of 1-allyl-3-methylimidazolium chloride (AmimCl), 1-ethyl-3-methylimidazolium acetate (C2mimAc), 1-ethyl-3-methylimidazolium diethylphosphate (C2mim(EtO)$_2$PO$_2$), 1-ethyl-3-methylimidazolium methylphosphonate (C2mimMeOHPO$_2$), or 1-ethyl-3-methylimidazolium phosphinate (C2mimH$_2$PO$_2$), and after heating this to the spinning temperature, the solution was extruded by an extruder in a solidification bath under the conditions shown in Table 7, and cleaning and drying processes were performed, whereby cellulose fibers of Examples 22 to 28 and Comparative Examples 11 and 12 were obtained.

The properties of the cellulose fibers of each of Examples and Comparative Examples, and the process of producing cellulose fibers were measured by the following test method, and the results are shown in Table 7.

(1) Dynamic Friction Coefficient between Fiber and Roller

The dynamic friction coefficient between fiber and roller was obtained by a method in which while applying a tension of 0.353 cN/dtex to a fiber wound on a cylinder having a diameter of 25 mm of which the surface which is a friction body was manufactured in the same material as a guide or a roller, the angle of the incoming direction and the outgoing direction toward the friction body of the fiber was adjusted to 90°, and the dynamic friction coefficient μ of the fiber when being frictionized at a speed of 100 m/min in under an atmosphere of 25° C. and 65% RH was determined according to the following formula.

$$\mu = \frac{360 \times 2.3026}{2\pi\theta} \times \log_{10}\left(\frac{T_2}{T_1}\right) \quad \text{[Equation 4]}$$

$T_1$: Tension of the entry side to the friction body (tension corresponding to 0.353 cN per 1 dtex)

$T_2$: Tension of the exit side from the friction body

θ: 90°

π: Circular constant (2) Thread Breakage and Fluff

In the process of producing cellulose fibers, in a case where thread breakage and fluff in cellulose fiber occurred, the fiber was determined as X, and in a case where thread breakage and fluff in cellulose fiber did not occur, the fiber was determined as O.

(3) Yarn Nubble

In the process of producing purified cellulose fibers, in a case where yarn nubble occurred, the fiber was determined as X, and in a case where yarn nubble did not occur, the fiber was determined as O.

TABLE 7

|  | Example 22 | Example 23 | Example 24 | Example 25 | Example 26 | Example 27 | Example 28 | Comparative Example 11 | Comparative Example 12 |
|---|---|---|---|---|---|---|---|---|---|
| Ionic liquid | AmimCl | C2minAc | C2mim MeOHPO$_2$ | C2mimAc | C2mim (EtO)$_2$PO$_2$ | C2mim H$_2$PO$_2$ | C2mim (EtO)$_2$PO$_2$ | C2mimAc | AmimCl |
| Polysaccharide Coagulation vessel | Cellulose Water | Cellulose 20% ionic liquid aqueous solution | Cellulose 10% ionic liquid acetone solution | Cellulose Ethanol | Cellulose 20% ionic liquid aqueous solution | Cellulose Acetone | Cellulose 10% ionic liquid ethanol solution | Cellulose Water | Cellulose 20% ionic liquid aqueous solution |

TABLE 7-continued

|  | Example 22 | Example 23 | Example 24 | Example 25 | Example 26 | Example 27 | Example 28 | Comparative Example 11 | Comparative Example 12 |
|---|---|---|---|---|---|---|---|---|---|
| Dynamic friction coefficient between fiber-guide or roller | 0.33 | 0.29 | 0.09 | 0.16 | 0.19 | 0.23 | 0.13 | 0.41 | 0.04 |
| Thread breakage-fluff | O | O | O | O | O | O | O | X | O |
| Yarn nubble | O | O | O | O | O | O | O | O | X |

As shown in Table 7, in Examples 22 to 28 in which the dynamic friction coefficient between roller and polysaccharide fiber is 0.05 to 0.35, thread breakage and fluff in the fiber and yarn nubble of the fiber in the production process did not occur, and thus the productivity was good.

In contrast, in Comparative Example 11 in which the dynamic friction coefficient between roller and polysaccharide fiber is greater than 0.35, thread breakage and fluff in the fiber occurred, and in Comparative Example 12 in which the dynamic friction coefficient between roller and polysaccharide fiber is less than 0.05, yarn nubble which is derailment of polysaccharide fiber from the running line occurred, and thus the productivity of the fibers was decreased.

[Manufacture of Purified Cellulose Fiber]

Filtration was performed on a cellulose solution obtained by dissolving pulp to be 10% by mass (wt %) in 1-ethyl-3-methylimidazolium acetate (C2mimAc), and degassing was performed. After heating the solution to the spinning temperature, the solution was extruded by an extruder in a solidification bath under the conditions shown in Table 8, and cleaning and drying processes were performed, whereby purified cellulose fibers of Examples 29 to 31 and Comparative Example 13 were obtained.

In Table 8, as the type of the solidification bath, a horizontal type and a vertical type can be exemplified. The horizontal type refers to a disposition of the solidification bath shown in FIG. 3, and the vertical type refers to a disposition of the solidification bath shown in FIG. 4.

The properties of the purified cellulose fiber of each of Examples and Comparative Example were measured by the following test method, and the results are shown in Table 8.

(1) Evaluation Method of Strength

For a fiber which was false-twisted four times per 10 cm, a tensile test was performed using a tensile testing machine, and strength was measured.

(2) Evaluation Method of Productivity

The productivity of the purified cellulose fibers of each of Examples and Comparative Example was evaluated by the number of thread breakages that occurred when fiber of 5 kg was manufactured. In Table 8, O shows that the number of thread breakages is 0 to 2, and X shows that the number of thread breakages is 3 or more.

TABLE 8

|  | Example 29 | Example 30 | Example 31 | Comparative Example 13 |
|---|---|---|---|---|
| Ionic liquid | C2mimAc | C2mimAc | C2mimAc | C2mimAc |
| Solidification liquid | Water | Water | Water | Water |
| Cellulose concentration | 10% by mass | 10% by mass | 10% by mass | 10% by mass |
| Spinning temperature | 110° C. | 110° C. | 110° C. | 110° C. |
| Nozzle diameter | 550 μm | 550 μm | 550 μm | 550 μm |
| Discharging amount | 0.8 g/min · opening | 0.8 g/min · opening | 0.8 g/min · opening | 0.8 g/min · opening |
| Winding speed ($V_a$) | 100 m/min | 120 m/min | 150 m/min | 120 m/min |
| Flow speed of solidification liquid ($V_b$) | 67 m/min | 57 m/min | 31 m/min | 0 m/min |
| $V_b/V_a$ (%) | 67% | 48% | 21% | 0% |
| Solidification bath type | Horizontal type | Horizontal type | Horizontal type | Horizontal type |
| Strength | 8.4 cN/dtex | 9.0 cN/dtex | 12.1 cN/dtex | 7.9 cN/dtex |
| Productivity | O | O | O | X |

As shown in Table 8, in Examples 29 to 31 in which the solidification liquid flowed in the solidification bath along the discharging direction of the cellulose solution, it was possible to produce purified cellulose fibers having high strength with good productivity. In contrast, In Comparative Example 13 in which the solidification liquid did not flow in the solidification bath, a thread breakage occurred, and the strength was poor.

Furthermore, it was confirmed that in Examples 1 to 3 in which the flow speed Vb at which the solidification liquid flows in the solidification bath was 10% to 90% of the winding speed Va (Vb/Va is 10% to 90%), and the winding speed was 80 m/min or greater, cellulose fibers having strength of 8.0 cN/dtex or greater was produced with good productivity.

Moreover, it was confirmed that in Example in which the winding speed Va was 80 m/min or greater, productivity of the purified cellulose fibers was better compared to a case where the winding speed Va was less than 80 m/min.

In addition, it was confirmed that in Example in which Vb/Va was 90% or less, water flow in the solidification liquid was likely to be stable, it was possible to easily obtain uniform cellulose fibers, and thus productivity of the purified cellulose fibers was better compared to a case where Vb/Va is greater than 90%.

[Evaluation of Productivity in Production of Cellulose Fiber]

Cellulose solutions were manufactured by dissolving pulp in each of 1-allyl-3-methylimidazolium chloride (AmimCl), 1-ethyl-3-methylimidazolium acetate (C2mimAc), 1-ethyl-3-methylimidazolium diethylphosphate (C2mim(EtO)$_2$PO$_2$), 1-ethyl-3-methylimidazolium methylphosphonate (C2mimMeOHPO$_2$), or 1-ethyl-3-methylimidazolium phosphinate (C2mimH$_2$PO$_2$), and after heating this to the spinning temperature, the solution was discharged by an discharger in a solidification bath under the conditions shown in Table 9, and cleaning and drying processes were performed, whereby cellulose fibers were obtained.

The materials of the internal parts of the discharger, the gear pump, the discharge opening, the solidification bath, and the cleaning bath used in each of Examples and Comparative Examples, the presence or absence of coating thereof, and the coating material thereof are shown in Table 9.

In addition, corrosivity of the internal parts of the dissolution apparatus, the internal parts of the discharger, the gear pump, the discharge opening, the solidification bath, and the cleaning bath in each of Examples and Comparative Examples, and corrosivity of the coating material are shown in Table 9.

The productivity decrease due to problems caused by the dissolution apparatus, the discharger, the gear pump, the discharge opening, the solidification bath, or the cleaning bath in each of Examples and Comparative Examples was evaluated in an item of "productivity" shown in Table 9. A case where the problems rarely occurred was evaluated as O, and a case where the problems frequently occurred was evaluated as X. The types of the problems were stop of the dissolution apparatus or the dispenser, stability decrease of discharging amount, clogging in the discharge opening, and turbidity in the solidification bath or the cleaning bath.

An evaluation method of corrosivity will be shown below.

(1) Evaluation Method of Corrosivity

The internal parts of the dissolution apparatus, the internal parts of the discharger, the gear pump, the discharge opening, the solidification bath, and the cleaning bath in each of Examples and Comparative Examples, and those (hereinafter, referred to as these parts) obtained by coating these with coating materials shown in Table 9 were immersed for 14 days in the ionic liquid shown in Table 9 which was filled in the test vessel made of silver, and corrosion actions of these parts were evaluated. The amount of the metal material removed from the surface of these parts was determined as mm/year. Moreover, these parts were insulated from each other and the test vessel using holders made of polytetrafluoroethylene (PTFE).

TABLE 9

| | Example 32 | Example 33 | Example 34 | Example 35 | Example 36 | Comparative Example 14 | Comparative Example 15 | Comparative Example 16 | Comparative Example 17 |
|---|---|---|---|---|---|---|---|---|---|
| Ionic liquid | C2mim(EtO)$_2$PO$_2$ | C2mimAc | AmimCl | C2mimAc | C2mimMeOHP$_2$ | C2mim(EtO)$_2$PO$_2$ | C2mimMeOHP$_2$ | C2mimAc | AmimCl |
| Material of internal parts of dissolution apparatus, internal parts of discharger, gear pump, discharge opening, solidification bath, and cleaning bath | Stainless steel SUS304 | Nickel alloy MA22 Ni-22Cr-13Mo-4Fe-3W (mass %) | Carbon steel S60C | Aluminum alloy AlMg3 | Carbon steel S60C | Aluminum alloy AlMg3 | Carbon steel S60C | Copper | Brass C2801 |
| Presence or absence of coating and material thereof | None | None | Fluorine-containing teflon | Ceramic silicon nitride | Ceramic silicon nitride | None | None | None | None |
| Corrosivity of internal parts of dissolution apparatus, internal parts of discharger, discharge opening, solidification bath, and cleaning bath | 0.02 mm/year | 0.01 mm/year | 6.1 mm/year | 0.58 mm/year | 19 mm/year | 0.64 mm/year | 19 mm/year | 2.4 mm/year | 2.1 mm/year |
| Corrosivity of coating material | — | — | 0.01 mm/year | 0.02 mm/year | 0.02 mm/year | — | — | — | — |
| Productivity | O | O | O | O | O | X | X | X | X |

As shown in Table 9, in Examples 32 and 33 using the apparatus that produces polysaccharide solids in which the materials of the internal parts of the discharger, the gear pump, the discharge port, the solidification bath, and the cleaning bath which were in contact with the ionic liquid had corrosion resistance with respect to the ionic liquid, it was possible to produce cellulose fibers with high productivity.

Even in Examples 34 to 36 using the apparatus that produces polysaccharide solids in which the internal parts of the discharger, the gear pump, the discharge port, the solidification bath, and the cleaning bath which were in contact with the ionic liquid were coated with a material having corrosion resistance with respect to the ionic liquid, it was possible to produce cellulose fibers with high productivity.

In contrast, in Comparative Examples 14 to 17 using the apparatus that produces polysaccharide solids in which the materials of the internal parts of the discharger, the gear pump, the discharge port, the solidification bath, and the cleaning bath which were in contact with the ionic liquid did not have corrosion resistance with respect to the ionic liquid, it was not possible to produce cellulose fibers with high productivity.

INDUSTRIAL APPLICABILITY

According to the production method for purified polysaccharide fibers of the present invention, since it is possible to efficiently produce purified polysaccharide fibers having excellent strength without generating harmful substances such as carbon disulfide, it is possible to reduce the environmental load.

In addition, since the purified polysaccharide fibers and the rubber-fiber complex of the present invention have excellent strength, utility value thereof is high.

Furthermore, since the tire of the present invention is made of the rubber-fiber complex of the present invention, the tire has good tire performance.

Therefore, the present invention is highly useful from an industrial viewpoint.

REFERENCE SIGNS LIST

1 . . . Extruder, 2 . . . Spinneret, 3 . . . Roller, 4 . . . Withdrawal roller, 5 . . . First solidification bath, 6 . . . First solidification liquid, 7, 7a, 7b . . . Intermediate, 15 . . . Second solidification bath, 16 . . . Second solidification liquid, 25 . . . Third solidification bath, 26 . . . Third solidification liquid, 101 . . . Extruder, 102 . . . Spinneret, 103 . . . Roller, 104 . . . Withdrawal roller, 105 . . . Solidification bath, 106 . . . Solidification liquid, 107 . . . Polysaccharide fiber, 201, 311 . . . Extruder, 202, 312 . . . Spinneret, 203 . . . Roller, 204, 314 . . . Withdrawal roller, 205, 15 . . . Solidification bath, 206, 316 . . . Solidification liquid, 207, 317 . . . Purified cellulose fiber, 313 . . . Flow pipe, 315a . . . Supply pipe, 315b Emission pipe, 401 . . . Discharger, 402 . . . Discharge opening, 403, 403' . . . Roller, 404, 404' . . . Withdrawal roller, 405 . . . Solidification bath, 406 . . . Solidification liquid, 407 . . . Polysaccharide fiber, 408 . . . Cleaning bath, 409 . . . Cleaning solution, 410 . . . Cylinder, 411 . . . Single screw, 411a . . . Flight scraper, 411b . . . Screw axis, 412 . . . Dissolution apparatus, 413 . . . Gear pump, 414 . . . Polysaccharide raw material, 420 . . . Apparatus that produces a polysaccharide solid

The invention claimed is:

1. A production method for purified polysaccharide fibers of wet-spinning or dry-wet-spinning polysaccharide, the method comprising:
dissolving polysaccharide raw material in a dissolving liquid including an ionic liquid to obtain a polysaccharide solution, and
bringing the polysaccharide solution into contact with a solidification liquid including an ionic liquid and a poor solvent for the polysaccharide raw material to obtain purified polysaccharide fibers,
wherein a concentration of the ionic liquid in the solidification liquid is 20% by weight to 70% by weight,
wherein each of the ionic liquid in the polysaccharide solution and the ionic liquid in the solidification liquid is formed of a cationic moiety and an anionic moiety, and
wherein the anionic moiety is at least one member selected from the group consisting of a phosphinate ion, a phosphate ion, and a phosphonate ion represented by the following formula (C2):

$$X^2 - \underset{\underset{X^1}{|}}{\overset{\overset{O}{\|}}{P}} - O^-$$ (C2)

in the formula, each of $X^1$ and $X^2$ independently represents a hydrogen atom, a hydroxyl group, or an alkoxy group having 1 to 4 carbon atoms.

2. The production method for purified polysaccharide fibers according to claim 1,
wherein the ionic liquid includes a recycled product recovered from a solidification liquid used when producing purified polysaccharide fibers, and the amount of the recycled product is 90% by weight or greater, based on the total weight of the ionic liquid.

3. The production method for purified polysaccharide fibers according to claim 2,
wherein the recycling rate of the ionic liquid is 93% by weight or greater.

4. The production method for purified polysaccharide fibers according to claim 1,
wherein a plurality of solidification baths is disposed, from upstream toward downstream of a process of spinning the polysaccharide using the plurality of solidification baths which holds the solidification liquid, such that the concentration of the ionic liquid in the solidification liquid which is held is sequentially lowered, and
wherein, on a front side of the solidification bath of the uppermost upstream, the polysaccharide solution is extruded, thereafter, a semi-solid product of purified polysaccharide fibers is obtained by passing through the solidification bath, and the semi-solid product is solidified by sequentially using the other solidification baths toward downstream, whereby purified polysaccharide fibers are obtained.

5. The production method for purified polysaccharide fibers according to claim 1,
wherein the polysaccharide is cellulose.

6. The production method for purified polysaccharide fibers according to claim 1,
wherein the solidification liquid is formed of the ionic liquid, water, and/or an organic solvent.

7. The production method for purified polysaccharide fibers according to claim 6,
wherein the organic solvent is a polar solvent.

8. The production method for purified polysaccharide fibers according to claim 1,
wherein each temperature of all the solidification liquids is 5° C. to 60° C.

9. The production method for purified polysaccharide fibers according to claim 1,
wherein each retention time of the polysaccharides or the intermediates in all the solidification baths is 300 seconds or less.

10. The production method for purified polysaccharide fibers according to claim 1,
wherein each retention time of the polysaccharides or the intermediates in all the solidification baths is 120 seconds or less.

11. The production method for purified polysaccharide fibers according to claim 1, comprising:
a process of recycling the ionic liquid from the solidification liquid using a spray dry method.

12. The production method for purified polysaccharide fibers according to claim 1,
wherein the ionic liquid in the polysaccharide solution and the ionic liquid in the solidification liquid are the same compound.

13. The production method for purified polysaccharide fibers according to claim 1,
wherein the cationic moiety is one or more types selected from the group consisting of an imidazolium ion, a pyridinium ion, an ammonium ion, and a phosphonium ion.

14. The production method for purified polysaccharide fibers according to claim 13,
wherein the cationic moiety is the imidazolium ion.

15. The production method for purified polysaccharide fibers according to claim 14,
wherein the cationic moiety is the imidazolium ion represented by the following general formula (C1):

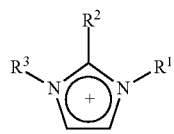

(C1)

in the formula, $R^1$ represents an alkyl group having 1 to 4 carbon atoms or an alkenyl group having 2 to 4 carbon atoms, $R^2$ represents a hydrogen atom or a methyl group, and $R^3$ represents an alkyl group having 1 to 8 carbon atoms or an alkenyl group having 2 to 8 carbon atoms.

16. The production method for purified polysaccharide fibers according to claim 1,
wherein the ionic liquid in the polysaccharide solution and/or the ionic liquid in the solidification liquid is 1-ethyl-3-methylimidazolium diethylphosphate.

17. The production method for purified polysaccharide fibers according to claim 1,
wherein the distance D from a place where the polysaccharide solution is extruded to be a fiber shape to a place where the extruded polysaccharide solution is in contact with the solidification liquid is 50 mm to 120 mm.

18. A purified polysaccharide fiber produced by the production method for purified polysaccharide fibers according to claim 1.

19. A purified polysaccharide fiber produced by bringing a polysaccharide solution obtained by dissolving a polysaccharide raw material in a polar solvent or a liquid including an ionic liquid into contact with a solidification liquid and wet-spinning or dry-wet-spinning a polysaccharide, containing:
a main component formed of two or more types of polysaccharides, the polysaccharide having the largest content within the main component being a first main component,
wherein a proportion of the first main component is 97% by weight or less, based on all components constituting the purified polysaccharide fibers.

20. The purified polysaccharide fiber according to claim 19,
wherein the proportion of the first main component in all components constituting the purified polysaccharide fiber is 90% by weight or less.

21. The purified polysaccharide fiber according to claim 19,
wherein a proportion of a polysaccharide fiber obtained from the polysaccharide raw material is 60% by weight or greater.

22. The purified polysaccharide fiber according to claim 19,
wherein the main component is cellulose and hemicellulose.

23. The purified polysaccharide fiber according to claim 19,
wherein a proportion of the main component in all components constituting the purified polysaccharide fiber is 90% by weight or greater.

24. The purified polysaccharide fiber according to claim 22,
wherein a proportion of the hemicellulose in all components constituting the purified polysaccharide fiber is 0.1% by weight to 40% by weight.

25. The purified polysaccharide fiber according to claim 19,
wherein the polar solvent is dipole molecules or zwitterionic molecules.

26. The purified polysaccharide fiber according to claim 19,
wherein the polar solvent is N-methylmorpholine-N-oxide.

27. The purified polysaccharide fiber according to claim 19,
wherein the ionic liquid is formed of a cationic moiety and an anionic moiety, and the cationic moiety is one or more types selected from the group consisting of an imidazolium ion, a pyridinium ion, an ammonium ion, and a phosphonium ion.

28. The purified polysaccharide fiber according to claim 27,
wherein the cationic moiety is the imidazolium ion represented by the following general formula (C1):

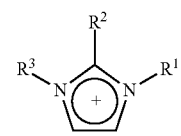

(C1)

in the formula, $R^1$ represents an alkyl group having 1 to 4 carbon atoms or an alkenyl group having 2 to 4 carbon atoms, $R^2$ represents a hydrogen atom or a methyl group, and $R^3$ represents an alkyl group having 1 to 8 carbon atoms or an alkenyl group having 2 to 8 carbon atoms.

29. The purified polysaccharide fiber according to claim 27,
wherein the anionic moiety has a compound including a phosphorus atom.

30. The purified polysaccharide fiber according to claim 29,
wherein the compound including a phosphorus atom is any one of a phosphinate ion, a phosphate ion, and a phosphonate ion represented by the following general formula (C2):

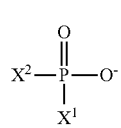

(C2)

in the formula, each of $X^1$ and $X^2$ independently represents a hydrogen atom, a hydroxyl group, or an alkoxy group having 1 to 4 carbon atoms.

31. The purified polysaccharide fiber according to claim 18,
wherein strength TB is 5.1 cN/dtex or greater.

32. The purified polysaccharide fiber according to claim 18,
wherein strength TB is 5.4 cN/dtex or greater.

33. A fiber-rubber complex produced by combining the purified polysaccharide fiber according to claim 18 and a rubber material.

34. A tire,
wherein the fiber-rubber complex according to claim 33 is used.

35. The tire according to claim 34, wherein the fiber-rubber complex is used as a carcass ply, a belt ply, or a belt-protecting layer.

* * * * *